US012558736B2

(12) United States Patent
Dadig et al.

(10) Patent No.: US 12,558,736 B2
(45) Date of Patent: Feb. 24, 2026

(54) MODULAR QUICK DISCONNECT SYSTEM FOR WELDING AND CUTTING SYSTEMS AND METHOD OF MAKING

(71) Applicant: AMERICAN TORCH TIP COMPANY, East Bradenton, FL (US)

(72) Inventors: Steven E. Dadig, Palmetto, FL (US); Juan Reynaldo Solis, Jr., Bradenton, FL (US)

(73) Assignee: AMERICAN TORCH TIP COMPANY, East Bradenton, FL (US)

( * ) Notice: Subject to any disclaimer, the term of this patent is extended or adjusted under 35 U.S.C. 154(b) by 326 days.

(21) Appl. No.: 18/050,633

(22) Filed: Oct. 28, 2022

(65) Prior Publication Data

US 2024/0139852 A1      May 2, 2024

(51) Int. Cl.
| | |
|---|---|
| *B23K 9/32* | (2006.01) |
| *B23K 9/29* | (2006.01) |
| *H01R 4/56* | (2006.01) |

(52) U.S. Cl.
CPC .............. *B23K 9/323* (2013.01); *B23K 9/295* (2013.01); *H01R 4/56* (2013.01)

(58) Field of Classification Search
CPC .......... B23K 9/323; B23K 9/295; H01R 4/56; H01R 9/05
USPC ............... 439/363, 578, 309, 380, 320, 825
See application file for complete search history.

(56) References Cited

U.S. PATENT DOCUMENTS

| | | | |
|---|---|---|---|
| 5,338,917 A | 8/1994 | Stuart et al. | |
| 5,449,304 A * | 9/1995 | Huss, Jr. .............. | H01R 13/187 439/825 |
| 5,951,337 A * | 9/1999 | Brake .................... | H01R 24/28 439/825 |
| 6,626,710 B1 * | 9/2003 | Tsai Huang ........... | H01R 24/58 439/669 |
| 6,713,711 B2 | 3/2004 | Conway et al. | |
| 7,309,844 B2 | 12/2007 | Lajoie | |

(Continued)

FOREIGN PATENT DOCUMENTS

| | | |
|---|---|---|
| CN | 211387311 U | 9/2020 |
| EP | 1 572 409 B1 | 9/2005 |

(Continued)

*Primary Examiner* — Hae Moon Hyeon
(74) *Attorney, Agent, or Firm* — Emerson, Thomson & Bennett, LLC; Roger D. Emerson; Matt J. Wilson

(57) ABSTRACT

Provided in this disclosure is a detachable power connection, particularly for use with a welding system. A male conductor, retained within a first connector, is matingly received within a female conductor, retained within a second connector. An aligning insulator of the second connector encloses and internally retains the female conductor. The aligning insulator includes alignment features formed along an exterior surface of the aligning insulator. A locking body of the first connector retains the male conductor and includes an interior surface for defining an internal void for matingly receiving the exterior surface of the aligning insulator therein. The locking body includes second alignment features formed along the interior surface for matingly engaging the respective first alignment features. A locking nut is formed onto one of the first connector or second connector, for releasably securing the first and second connectors together to form the detachable power connection.

17 Claims, 23 Drawing Sheets

(56)             References Cited

U.S. PATENT DOCUMENTS

| | | | | |
|---|---|---|---|---|
| 7,390,209 | B2 * | 6/2008 | Liu | H01R 13/5213 |
| | | | | 439/271 |
| 7,665,996 | B2 | 2/2010 | Jaeger | |
| 7,682,208 | B2 | 3/2010 | Bankstahl | |
| 7,695,024 | B2 | 4/2010 | Ostergren et al. | |
| 8,241,068 | B2 * | 8/2012 | Millard | H01R 13/6461 |
| | | | | 439/660 |
| 10,749,284 | B2 * | 8/2020 | Maruno | H01R 13/15 |
| 10,766,093 | B2 | 9/2020 | Solis, Jr. | |
| 10,906,123 | B2 | 2/2021 | Pike et al. | |
| 11,185,942 | B2 | 11/2021 | Schmitz et al. | |
| 12,046,855 | B2 * | 7/2024 | Klein | H01R 13/625 |
| 2004/0248476 | A1 * | 12/2004 | Zhang | H01R 24/28 |
| | | | | 439/825 |
| 2009/0269958 | A1 * | 10/2009 | Fujiwara | H01R 13/622 |
| | | | | 439/320 |
| 2012/0248085 | A1 | 10/2012 | Jansma | |
| 2015/0229070 | A1 * | 8/2015 | Van Swearingen | H01R 13/15 |
| | | | | 29/828 |
| 2015/0266129 | A1 | 9/2015 | Ihde et al. | |
| 2015/0306695 | A1 | 10/2015 | Oberndorfer et al. | |
| 2016/0016249 | A1 | 1/2016 | Bellile et al. | |
| 2018/0050415 | A1 | 2/2018 | Kachline | |
| 2020/0395711 | A1 * | 12/2020 | Klein | H01R 24/005 |
| 2021/0057839 | A1 | 2/2021 | Haney et al. | |
| 2021/0063014 | A1 * | 3/2021 | Dadig | B23K 9/323 |
| 2021/0331267 | A1 * | 10/2021 | Dadig | B23K 9/173 |

FOREIGN PATENT DOCUMENTS

| | | | |
|---|---|---|---|
| KR | 200144443 Y1 | 6/1999 | |
| KR | 20140058235 A | 10/2014 | |

* cited by examiner

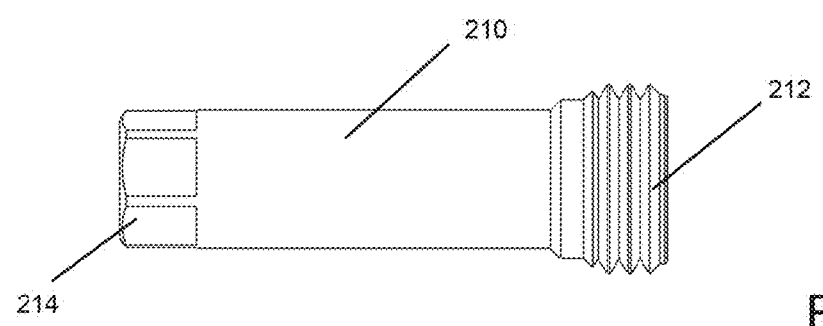
FIG. 13A
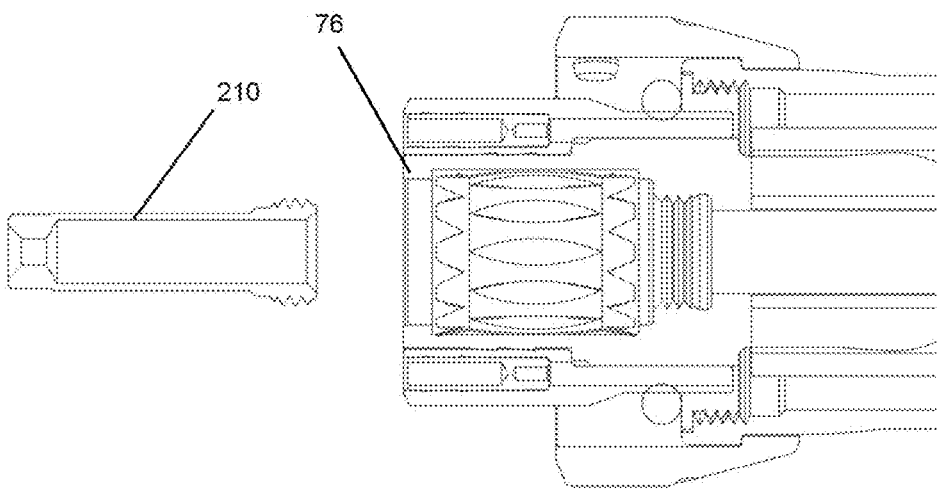
FIG. 13B
FIG. 13C

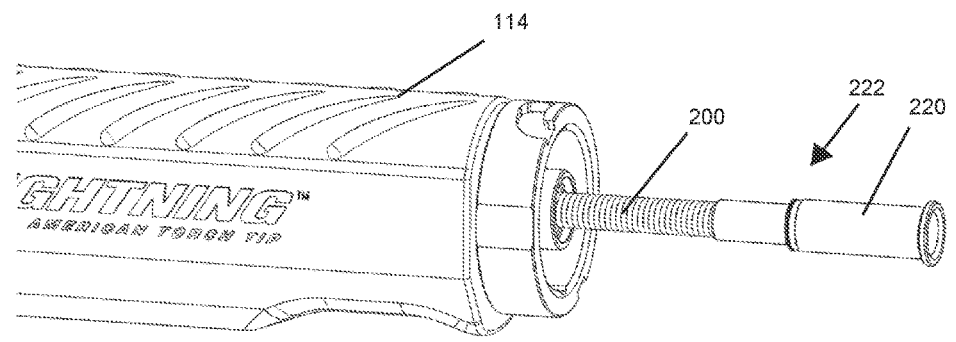
FIG. 17A
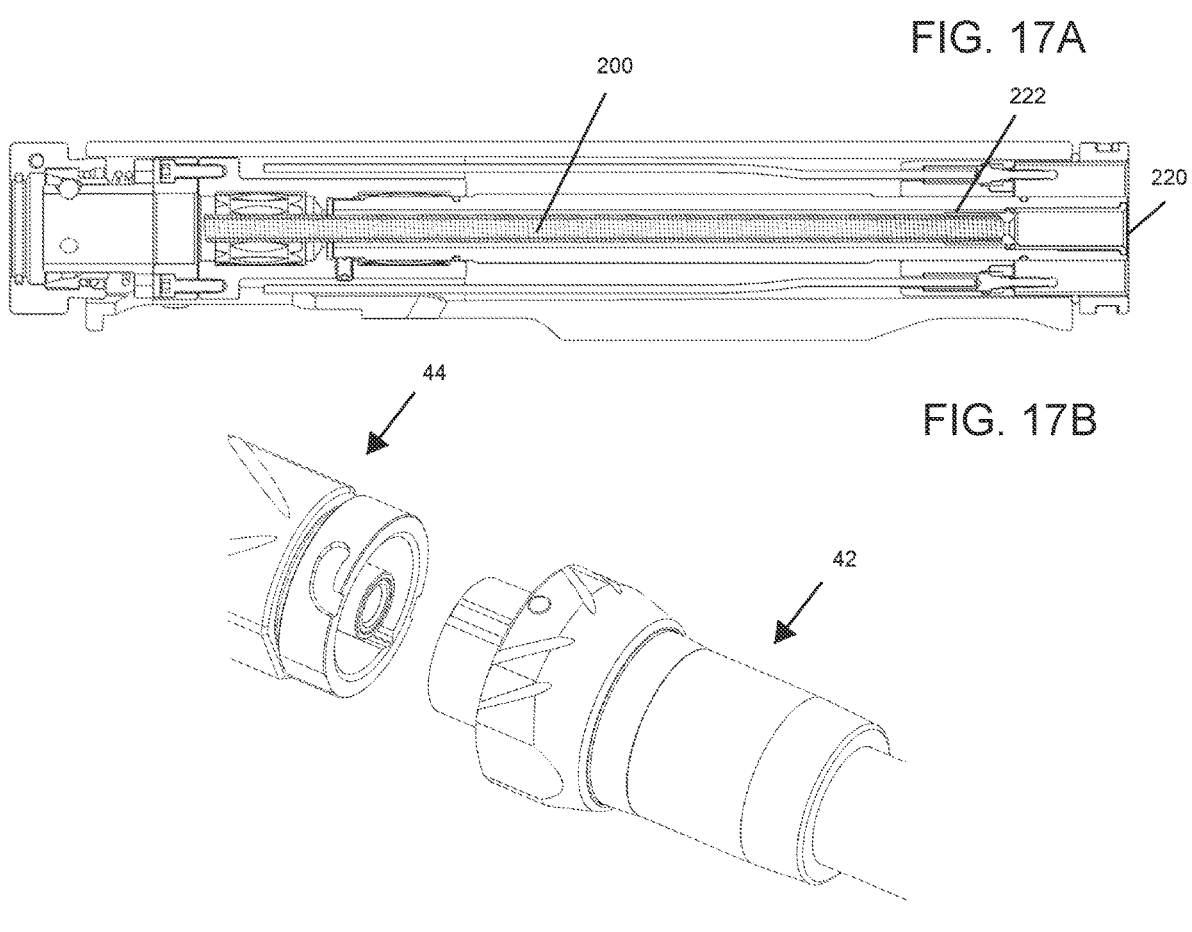
FIG. 17B
FIG. 17C

232

222

232

230

234

230

240

244

242

240

244

242

MODULAR QUICK DISCONNECT SYSTEM FOR WELDING AND CUTTING SYSTEMS AND METHOD OF MAKING

I. CROSS-REFERENCE TO RELATED APPLICATIONS

Not Applicable

II. STATEMENT REGARDING FEDERALLY SPONSORED RESEARCH OR DEVELOPMENT

Not Applicable

III. THE NAMES OF PARTIES TO A JOINT RESEARCH AGREEMENT

Not Applicable

IV. INCORPORATION-BY-REFERENCE OF MATERIAL SUBMITTED ON A READ-ONLY OPTICAL DISK, AS A TEXT FILE OR AN XML FILE VIA THE PATENT ELECTRONIC SYSTEM

Not Applicable

V. STATEMENT REGARDING PRIOR DISCLOSURES BY THE INVENTOR OR A JOINT INVENTOR

Not Applicable

VI. BACKGROUND

A. Technical Field

This invention pertains generally to the field of welding systems, specifically to arc welding systems which require multiple gun and cable systems for performing a range of arc welding amperages.

B. Description of Related Art

In typical gas metal arc welding (GMAW) and gas tungsten arc welding (GTAW) type welding operations, a welding torch/gun is used to deliver the arc to the weld in both automatic, semi-automatic and manual welding operations. These torches/guns are most commonly semi-permanently attached to an electrical cable via various securement configurations, including crimp, cone-and-nut, or clamp.

In the field of industrial use, the cable typically wears out before the torch/gun, resulting in a costly replacement of the entire torch/cable system. Welding at different amperages requires the utilization of different size cables, thus also requiring a complete gun and cable system for each amperage. It is costly for the end user to stock several complete systems to cover each required amperage.

As used in the industrial field, such welding systems typically span multiple shifts per day, thereby resulting in multiple users for each system. The multi-user aspect results in inventory issues and recriminations between the various users as to which individuals might be blamed for damaging the company's assets. Also, semi-permanent, fixed cables are stiff, resulting in wrist fatigue for the end user when orienting the torch/gun as needed throughout a workday.

VII. SUMMARY

Provided in this disclosure is a detachable power connection, particularly for use with a welding system. The present invention includes a first connector for matingly connecting with a second connector and a male conductor, retained within the first connector, matingly received within a female conductor, retained within the second connector. An aligning insulator of the second connector is provided for enclosing and internally retaining the female conductor. The aligning insulator includes one or more alignment features formed along an exterior surface of the aligning insulator. A locking body of the first connector is provided for retaining the male conductor, and includes an interior surface for defining an internal void for matingly receiving the exterior surface of the aligning insulator therein. The locking body includes one or more second alignment features formed along the interior surface for matingly engaging the respective first alignment feature(s) of the aligning insulator. A locking nut is formed onto one of the first connector or second connector, for releasably securing the first and second connectors together to form the detachable power connection.

In one exemplary embodiment of the present invention, the male conductor, the female conductor, the aligning insulator, and the locking body are of a generally cylindrical configuration, and are configured to matingly receive their respective components in concentric alignment along a common cylindrical axis. Moreover, the detachable power connection can include an electrical cable having a first end and a second end, and having identical second connectors at each end for reversibly and interchangeably engaging with a first connector on an arc welding torch handle.

In another exemplary embodiment of the present invention, the first alignment feature(s) formed along the exterior surface of the aligning insulator can be one or more male protrusions extending linearly from a forward end to a rearward end of the aligning insulator. The second alignment feature(s) formed along the interior surface of the locking body can be one or more female receptacles extending linearly from a forward end to a rearward end of the locking body for matingly engaging the respective male protrusion. In one aspect, the male protrusion(s) are a pair of generally concave half-cylindrical protrusions each formed on opposing sides of the exterior surface of the aligning insulator, and the female recess(es) are a pair of generally convex half-cylindrical recesses each formed on opposing sides of the interior surface of the locking body.

In yet another exemplary embodiment of the present invention, the locking nut is retained on the second connector and includes an interior surface having a protruding lock feature for engaging with a recessed lock channel formed on an exterior surface of the first connector, such that the first connector and second connector are securely retained by engagement of the lock feature with the lock channel. In one aspect, the lock channel includes a slanted portion for guiding the lock feature, to enable the first and second connectors to be securely retained by at least a partial turn of the locking nut.

In still another exemplary embodiment of the present invention, a power-conducting contact spring is received over the male conductor when matingly received within the female conductor for connecting and facilitating electrical conduction between the male conductor and the female conductor. The female conductor includes a power connection barb in which the male conductor is matingly received.

In a further exemplary embodiment of the present invention, one or more signal wires are connected to an auxiliary contact retained in one of the aligning insulator or the locking body, for carrying a trigger signal. One or more auxiliary receivers are retained in the respective other of the aligning insulator or the locking body, for connecting with the respective auxiliary contact to carry the trigger signal. In one aspect, the auxiliary contact(s) include a pair of male auxiliary contacts for connecting to a respective pair of female auxiliary receivers via a respective pair of power-conducting contact springs.

In another further exemplary embodiment of the present invention, a liner is provided for transporting welding wire and extending continuously within the reversible cable. The liner includes first and second ends that are received and retained within respective first and second threaded caps each retained in the respective identical cable connectors. A receiver can be installed into one or both of the torch handle or the power pin handle. The receiver is configured to receive the threaded cap, and thereby permit entry of the welding wire. Each threaded cap is configured to be inserted into and through a bore of a power connection barb at each end of the reversible cable.

In yet another further exemplary embodiment of the present invention, a welding system includes an arc welding torch handle removably connected to an electrical cable having a first end and a second end and having identical cable connectors at each end for reversibly and interchangeably engaging with a handle connector on the arc welding torch handle. A detachable power connection is included in which the cable connectors and the handle connector can be defined by either a first connector or a second connector for matingly connecting to each other. The detachable power connection also includes a cylindrical male conductor, retained within the first connector along a cylindrical axis. The male conductor is matingly received within a cylindrical female conductor, concentrically retained within the second connector along the cylindrical axis. A cylindrical aligning insulator of the second connector is provided for enclosing and internally retaining the cylindrical female conductor along the cylindrical axis. A pair of male protrusions are formed on opposing sides along an exterior surface of the aligning insulator. A cylindrical locking body of the first connector is provided for retaining the cylindrical male conductor along the cylindrical axis. The cylindrical locking body includes an interior surface for defining an internal void for matingly receiving the exterior surface of the cylindrical aligning insulator therein. The cylindrical locking body includes a pair of female recesses formed on opposing sides along the interior surface for matingly engaging the respective pair of male protrusions of the cylindrical aligning insulator. A locking nut is formed onto the first connector and/or the second connector, for releasably securing the first and second connectors together to form the detachable power connection. The locking nut is retained on the second connector and comprises a cylindrical interior surface having a protruding lock feature for engaging with a recessed lock channel formed on a cylindrical exterior surface of the first connector, such that the first connector and second connector are securely retained by engagement of the lock feature with the lock channel.

In still another further exemplary embodiment of the present invention, a reversible electrical cable includes a cable first end and a cable second end. The cable first and second ends each include an identical cable connector for reversibly and interchangeably engaging with a corresponding connector on one of an arc welding torch handle or a power pin handle. Each of the identical cable connectors are configured to releasably secure the corresponding connector together to form a detachable power connection. The identical cable connectors are either a first connector or a matingly connectible second connector. The corresponding connector is a respective other of the first connector or the second connector. The detachable power connection includes a male conductor, retained within the first connector. The male conductor is matingly received within a female conductor, retained within the second connector. An aligning insulator of the second connector is provided for enclosing and internally retaining the female conductor, and also includes one or more first alignment features formed along an exterior surface of the aligning insulator. A locking body of the first connector is provided for retaining the male conductor. The locking body includes an interior surface for defining an internal void for matingly receiving the exterior surface of the aligning insulator therein. The locking body also includes one or more second alignment features formed along the interior surface for matingly engaging the respective first alignment feature(s) of the aligning insulator. A locking nut is formed onto either the first connector or second connector, for releasably securing the first and second connectors together to form the detachable power connection. The reversible electrical cable additionally includes a liner for transporting welding wire and extending continuously within the reversible cable. The liner includes first and second ends that are received and retained within respective first and second threaded caps each retained within the respective identical cable connectors. A receiver is installed into the torch handle and/or the power pin handle, and is configured to receive the threaded cap, and thereby permit entry of the welding wire. Each threaded cap is configured to be inserted into and through a bore of a power connection barb at each end of the reversible cable.

In yet another further exemplary embodiment of the present invention, a welding system includes an arc welding torch handle removably connected to an electrical cable having a first end and a second end and having identical cable connectors at each end for reversibly and interchangeably engaging with a handle connector on the arc welding torch handle. A detachable power connection is provided such that the cable connectors and the handle connector are each respectively one of a first connector or a second connector for matingly connecting to each other. The detachable power connection includes a cylindrical male conductor, retained within the first connector along a cylindrical axis. The male conductor is matingly received within a cylindrical female conductor, concentrically retained within the second connector along the cylindrical axis. A cylindrical aligning insulator of the second connector is provided for enclosing and internally retaining the cylindrical female conductor along the cylindrical axis. A pair of male protrusions are formed on opposing sides along an exterior surface of the aligning insulator. A cylindrical locking body of the first connector is provided for retaining the cylindrical male conductor along the cylindrical axis. The cylindrical locking body includes an interior surface for defining an internal void for matingly receiving the exterior surface of the cylindrical aligning insulator therein. The cylindrical locking body includes a pair of female recesses formed on opposing sides along the interior surface for matingly engaging the respective pair of male protrusions of the cylindrical aligning insulator. A locking nut is formed onto either the first connector or second connector, for releasably securing the first and second connectors together to form the detachable power connection. The locking nut is retained on the second connector and includes a cylindrical interior surface having a protruding lock feature for engaging with a recessed lock channel formed on a cylindrical exterior surface of the first connector, such that the first connector and second connector are securely retained by engagement of the lock feature with the lock channel.

According to one aspect, the present invention provides an alternative to the commonplace welding torch/gun design semi-permanently attached to an electrical cable via various securement configurations, including crimp, cone-and-nut, or clamp.

According to another aspect, the present invention provides a detachable power connection that can be replaced when the cable wears out before the torch/gun, thereby avoiding a costly replacement of the entire torch/cable system.

According to yet another aspect, the present invention can accommodate welding at different amperages utilizing different size cables, to prevent stocking a complete gun and cable system for each amperage, thereby saving cost for the end user.

According to still another aspect, the present invention can be used in the industrial field with multiple daily shifts to reduce inventory issues and recriminations over damages to a company's assets.

According to still another aspect, the present invention provides cables that are less stiff, reducing wrist fatigue from orienting a welding torch/gun throughout a workday. Other benefits and advantages of this invention will become apparent to those skilled in the art to which it pertains upon reading and understanding of the following detailed specification.

VIII. BRIEF DESCRIPTION OF THE DRAWINGS

The disclosed welding system may take physical form in certain parts and arrangement of parts, embodiments of which will be described in detail in this specification and illustrated in the accompanying drawings which form a part hereof and wherein.

Figure 3A:
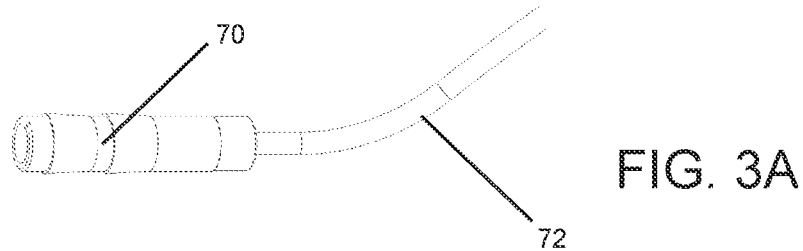
Figure 3B:
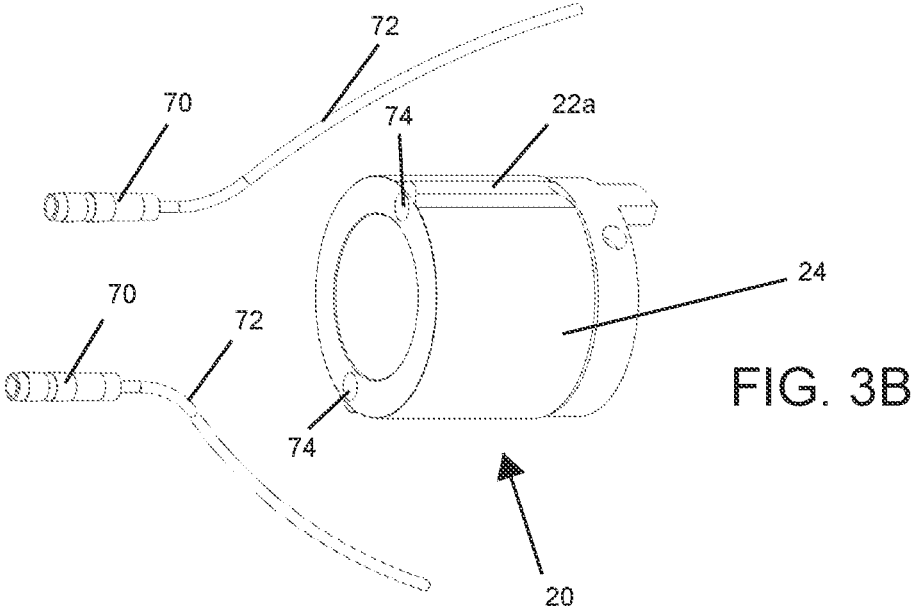
Figure 3C:
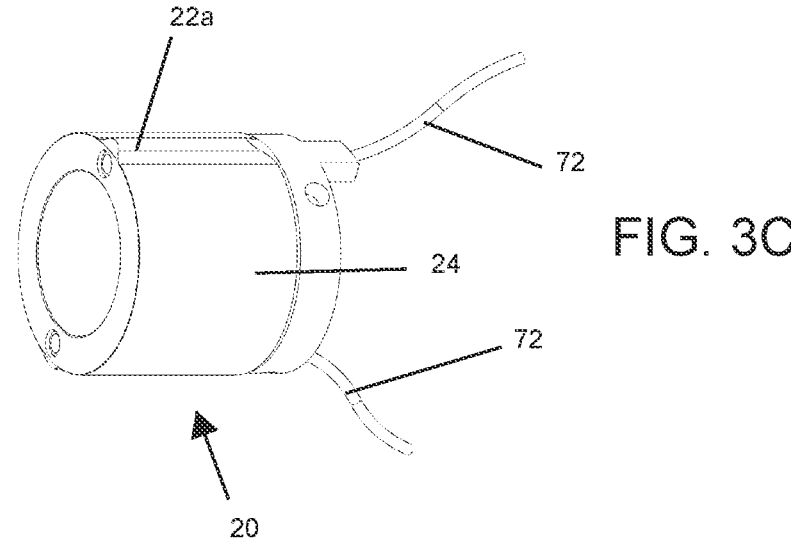

FIGS. 3A, 3B, and 3C are views depicting assembly steps of the auxiliary receivers of the cable assembly, in accordance with the present invention.

Figures 4A, 4B, 4C:
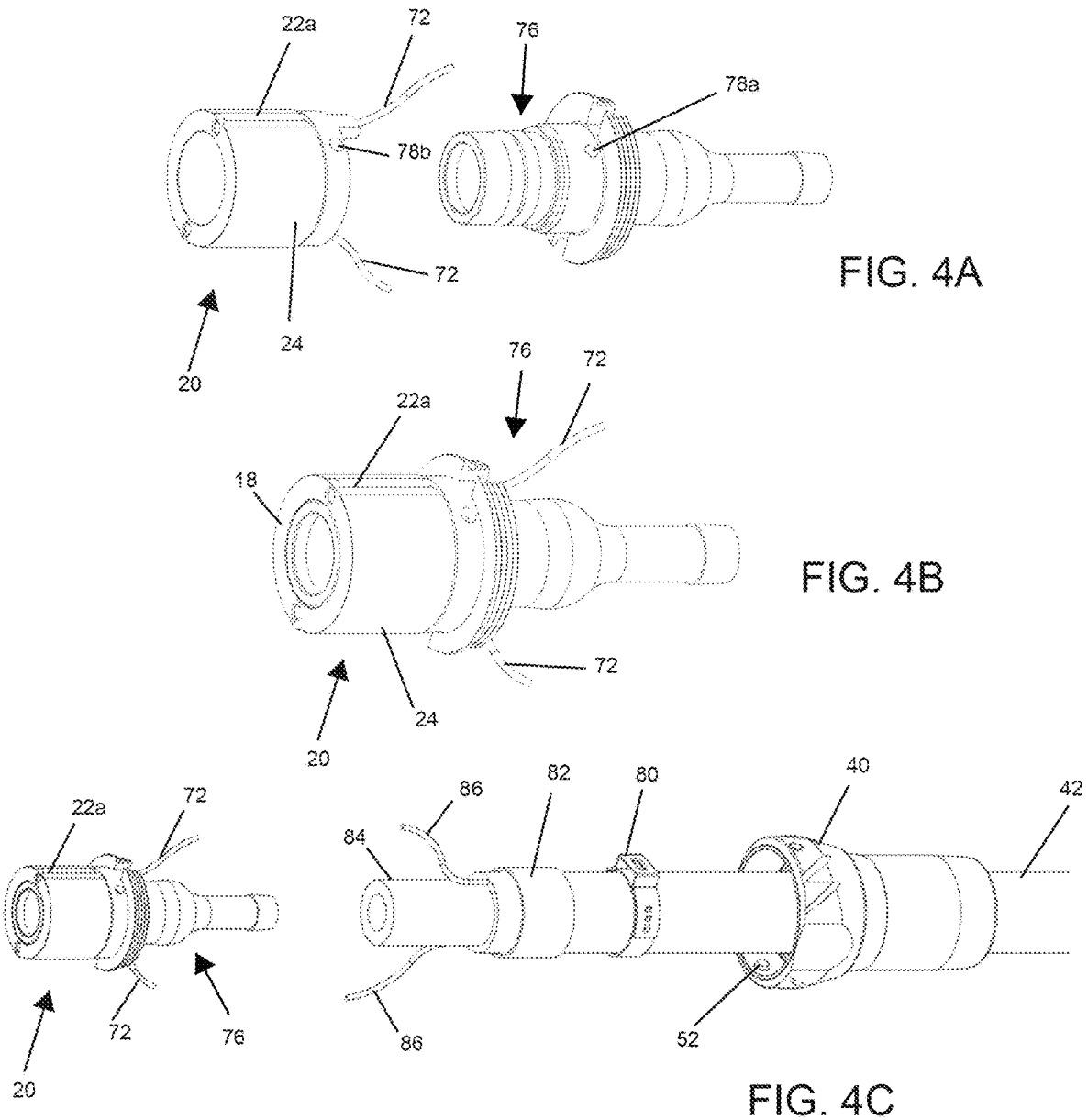

FIGS. 4A, 4B, and 4C depict further assembly steps of the power connection barb of the cable assembly, in accordance with the present invention.

Figures 5A, 5B, 5C:
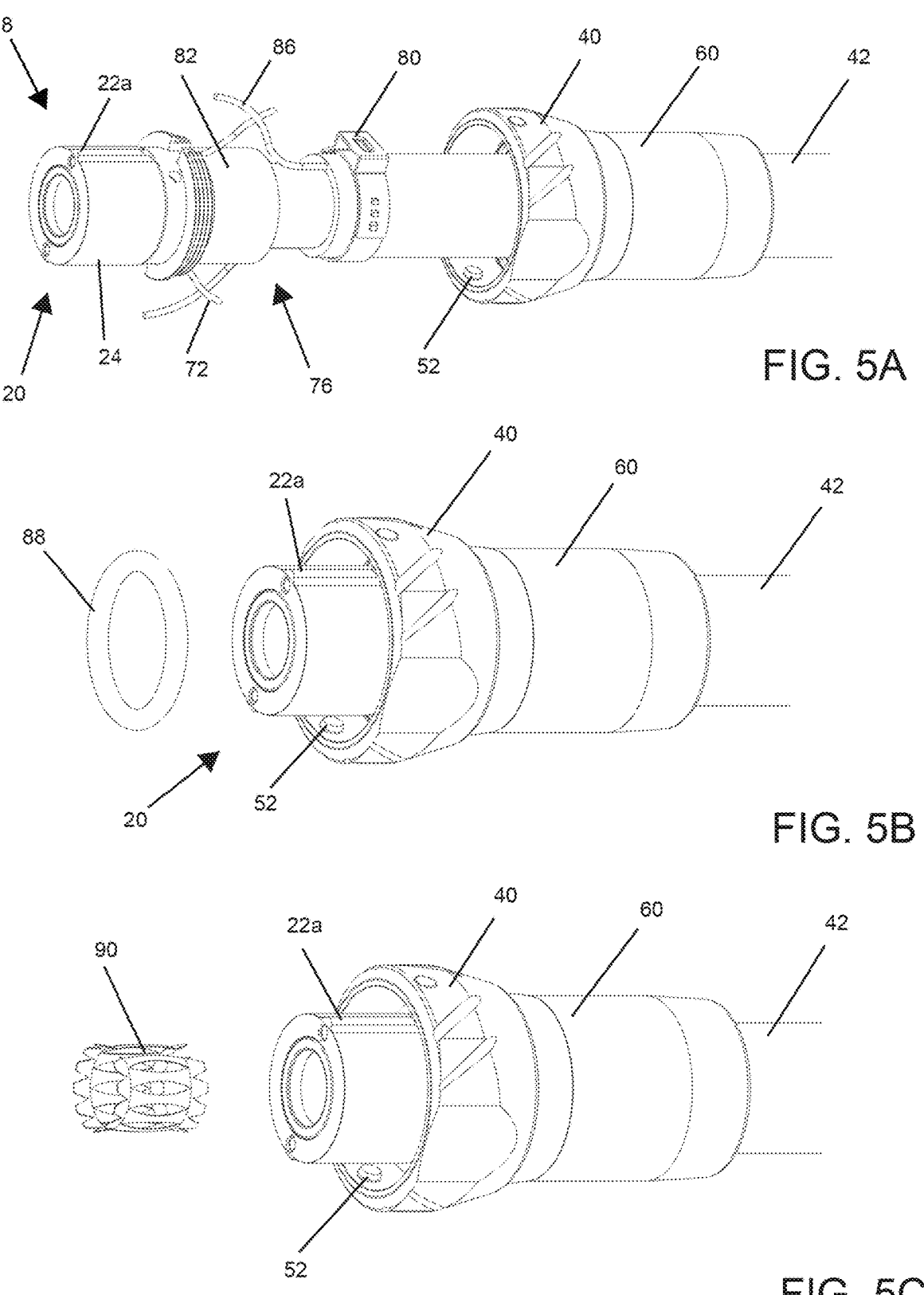

FIGS. 5A, 5B, and 5C are views depicting further assembly steps of the power connection barb of the cable assembly, in accordance with the present invention.

Figures 6A, 6B, 6C:
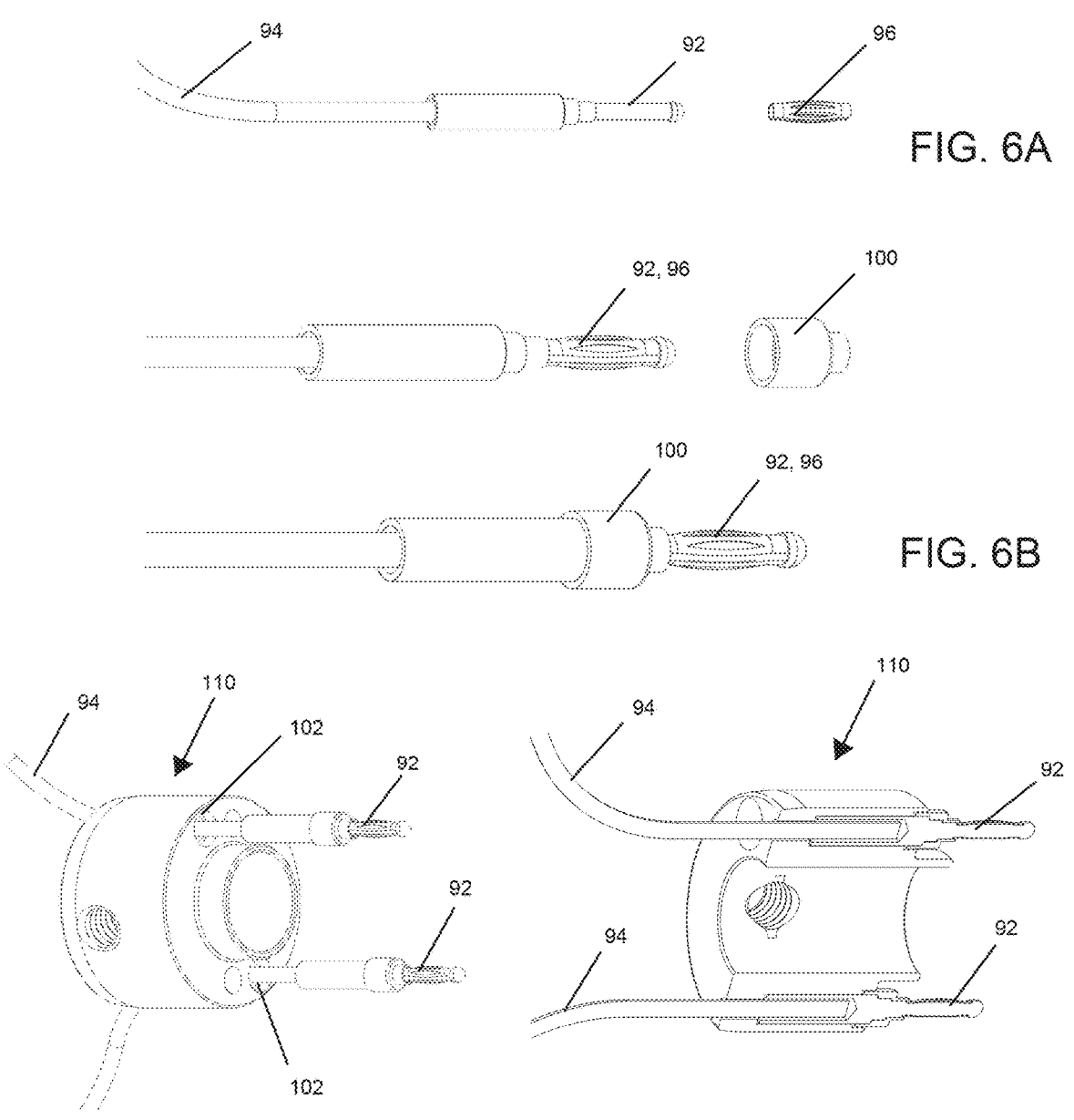

FIGS. 6A, 6B, and 6C depict assembly steps of the male auxiliary contacts into the gun assembly, in accordance with the present invention.

Figures 7A, 7B, 7C:
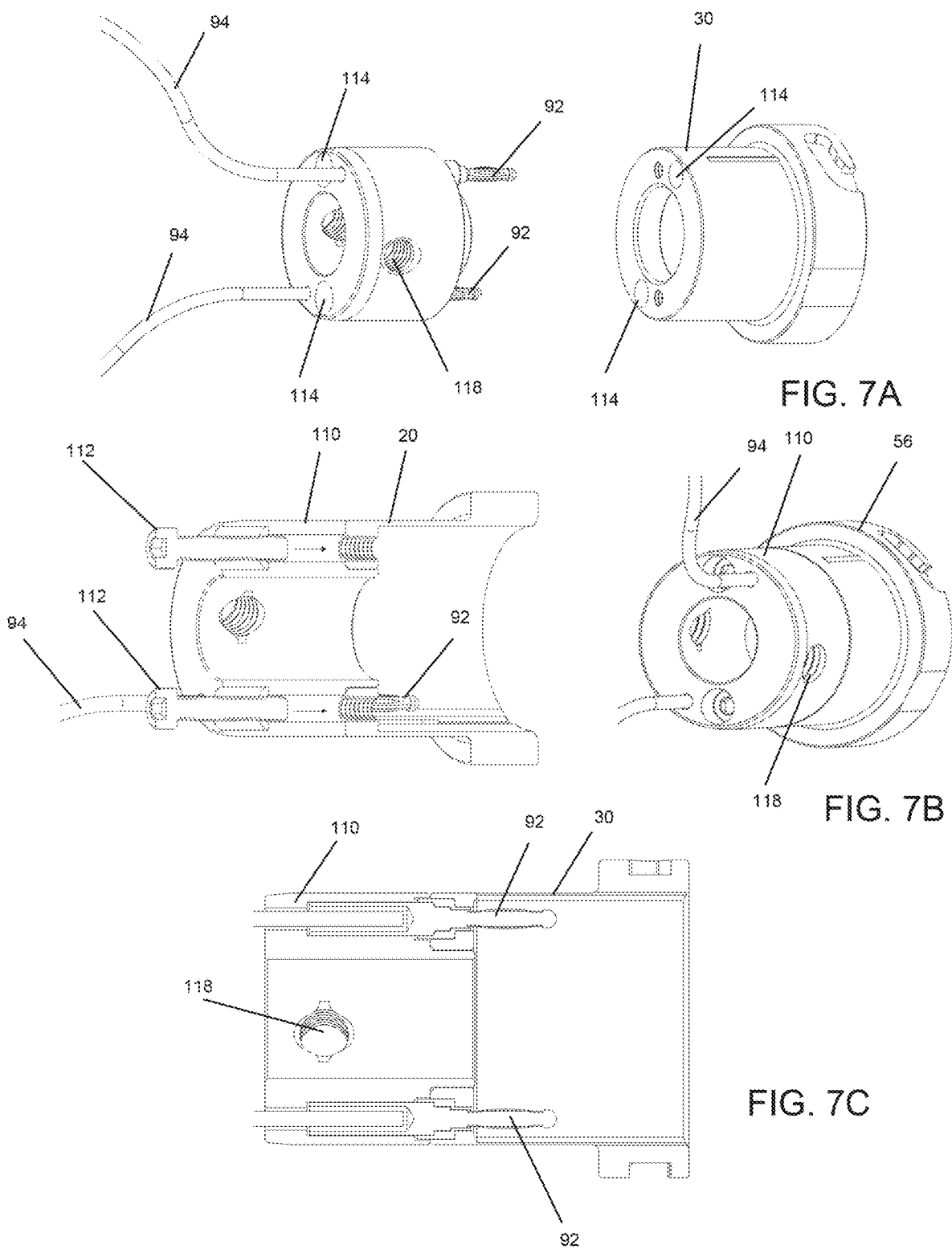

FIGS. 7A, 7B, and 7C depict further assembly steps of the male auxiliary contacts into the gun assembly, in accordance with the present invention.

Figures 8A, 8B, 8C:
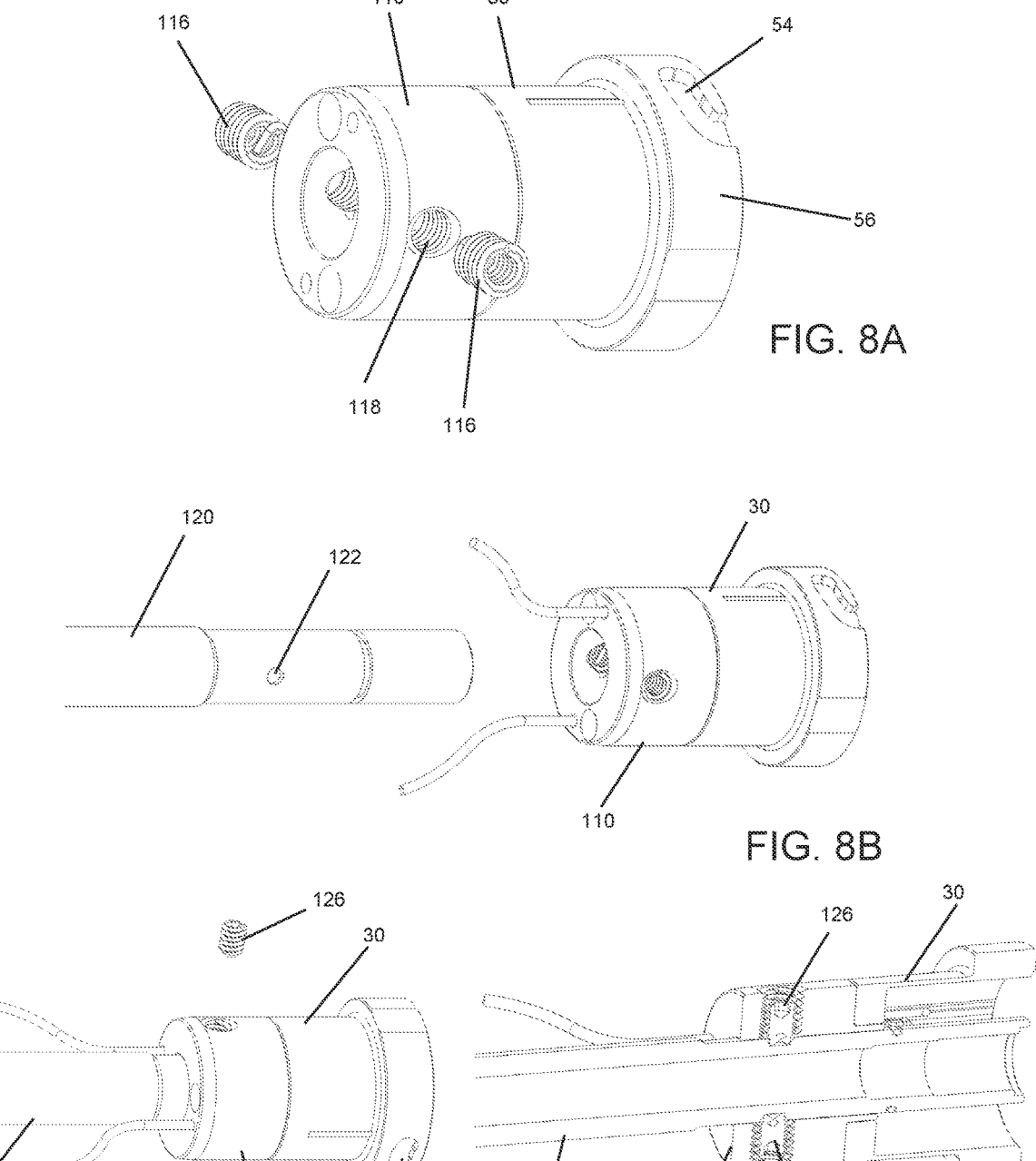

FIGS. 8A, 8B, and 8C depict the assembly of the coupling neck onto the locking body assembly of the gun assembly, in accordance with the present invention.

Figure 9A:
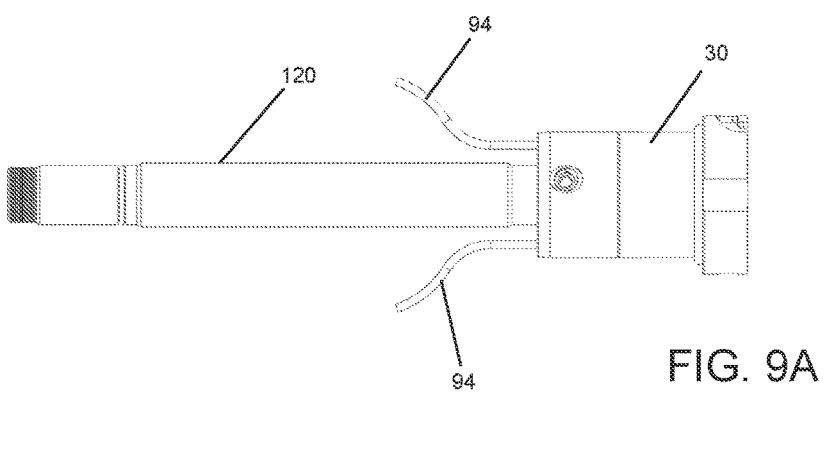
Figure 9B:
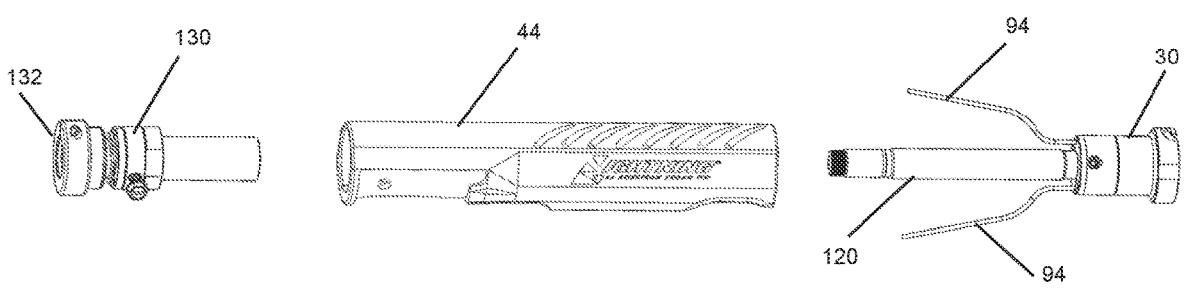
Figure 9C:
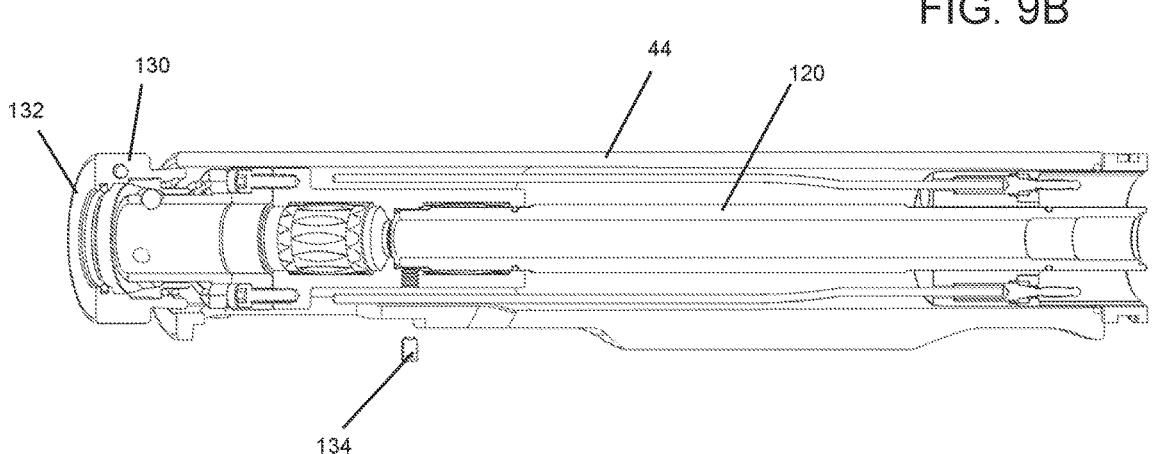

FIGS. 9A, 9B, and 9C are views depicting further assembly steps locking body assembly of the gun assembly, in accordance with the present invention.

Figure 10:
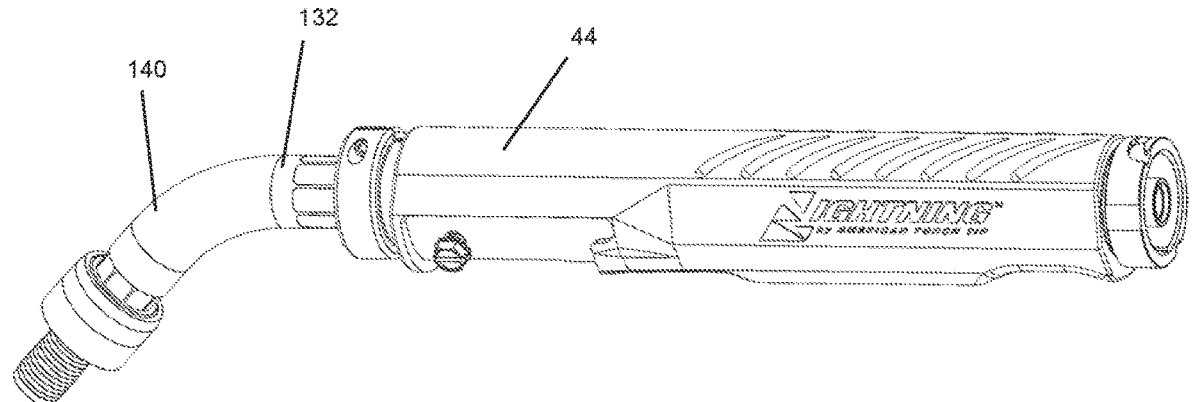

FIG. 10 depict the assembled quick disconnect handle with a gooseneck installed in accordance with the present invention.

Figure 11A:
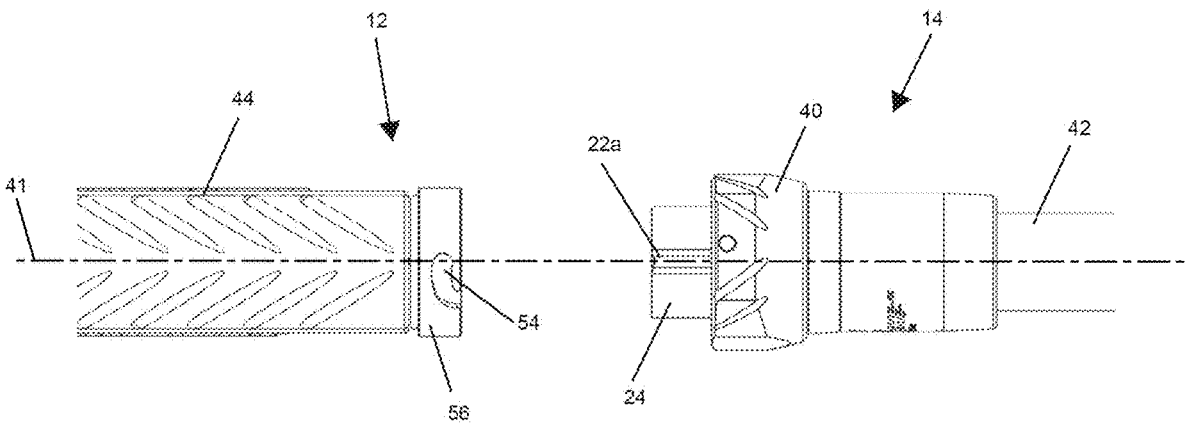
Figure 11B:
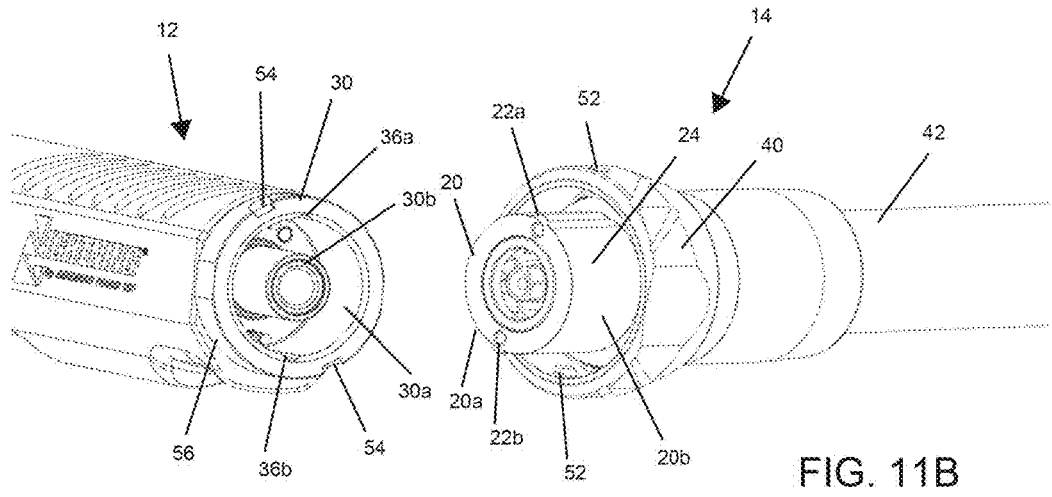

FIGS. 11A, 11B, and 11C depict the function of bringing the assemblies together in accordance with the present invention.

Figures 12A, 12B, 12C:
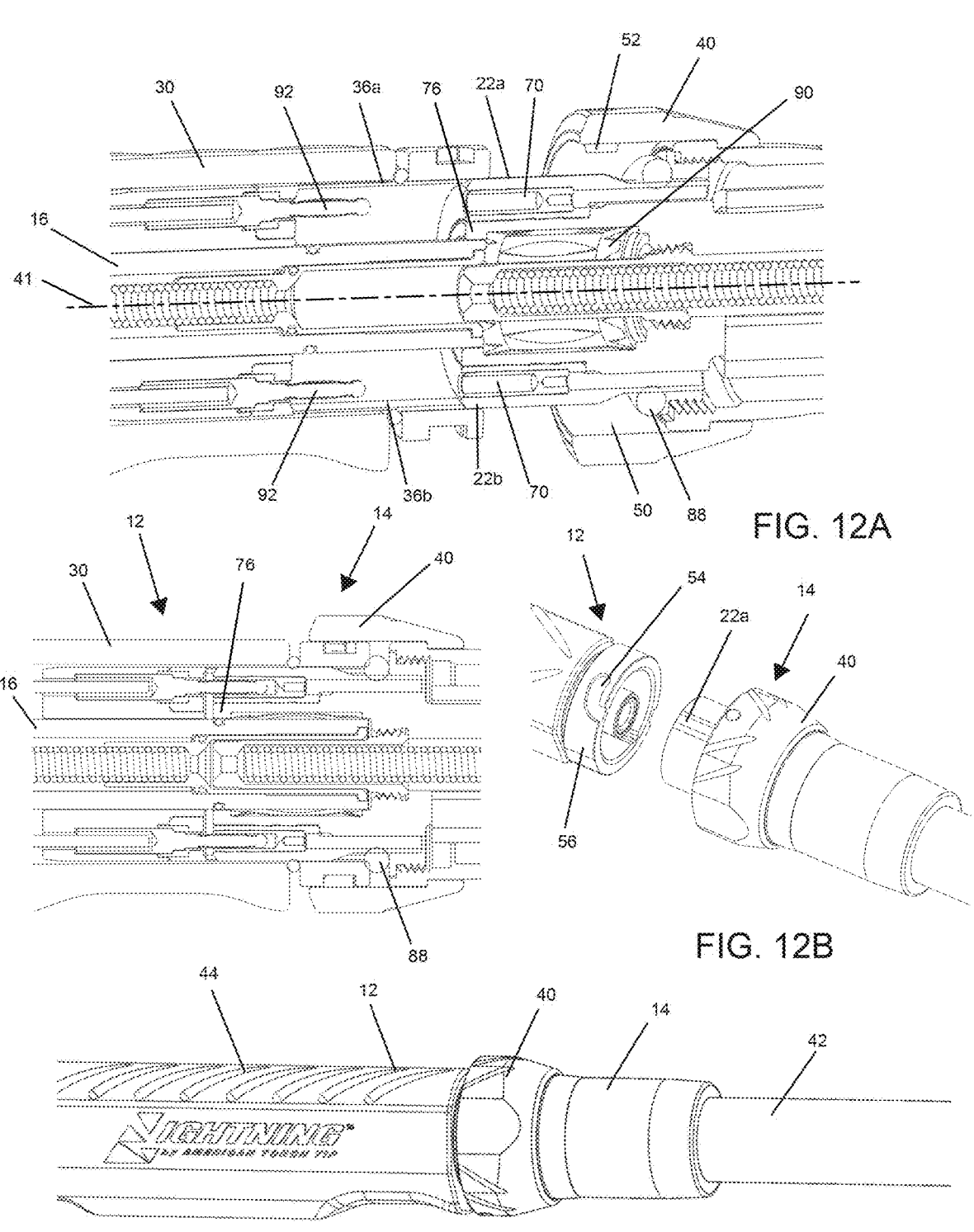

FIGS. 12A, 12B, and 12C are views depicting the alignment of the assembled handle and cable in accordance with the present invention.

FIGS. 13A, 13B, and 13C depict assembly steps of the liner system, in accordance with the present invention.

Figure 14A:
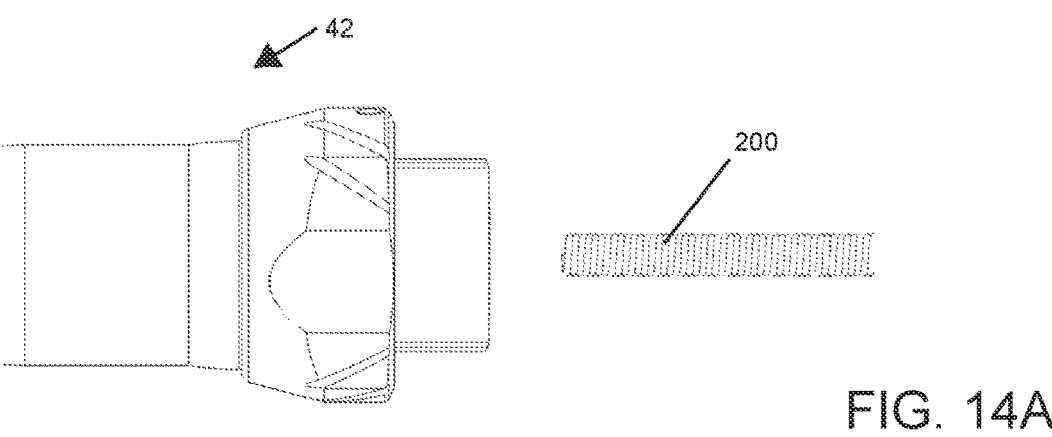
Figure 14B:
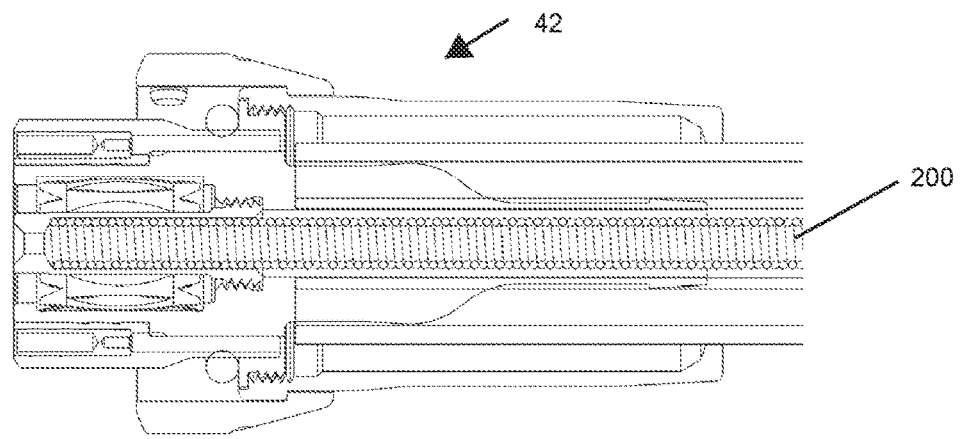
Figure 14C:
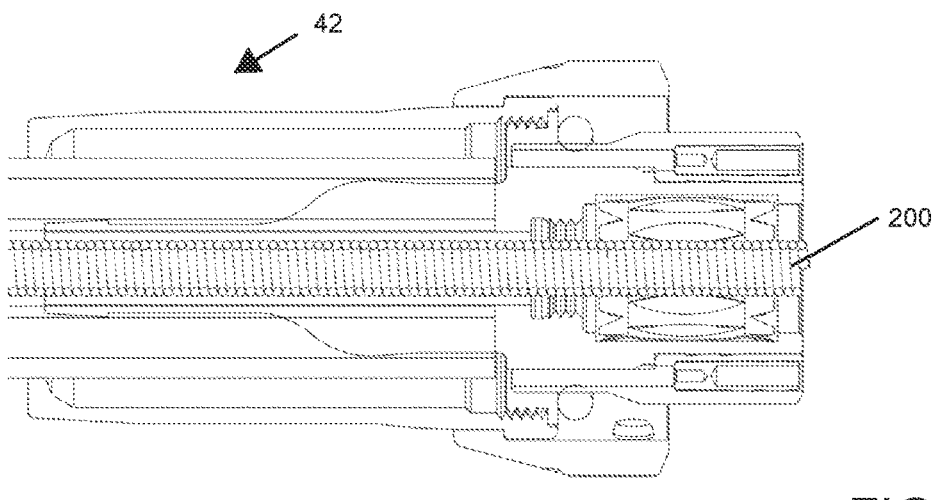
Figure 15A:
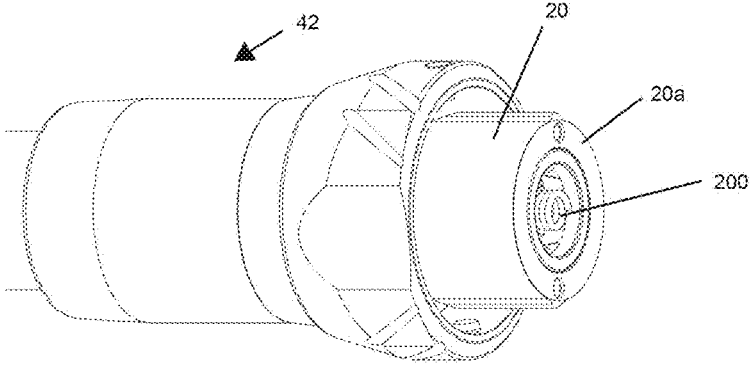
Figure 15B:
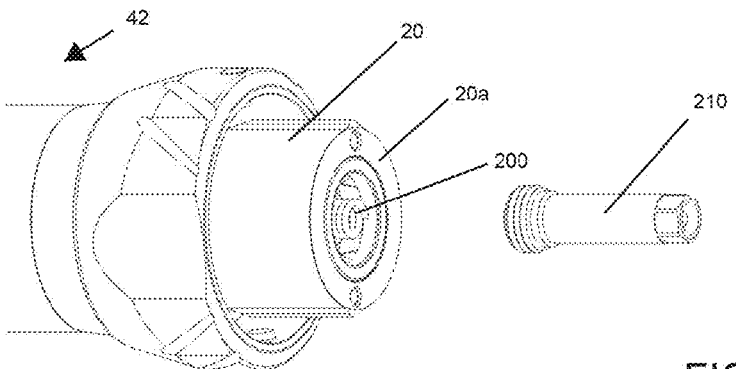
Figure 15C:
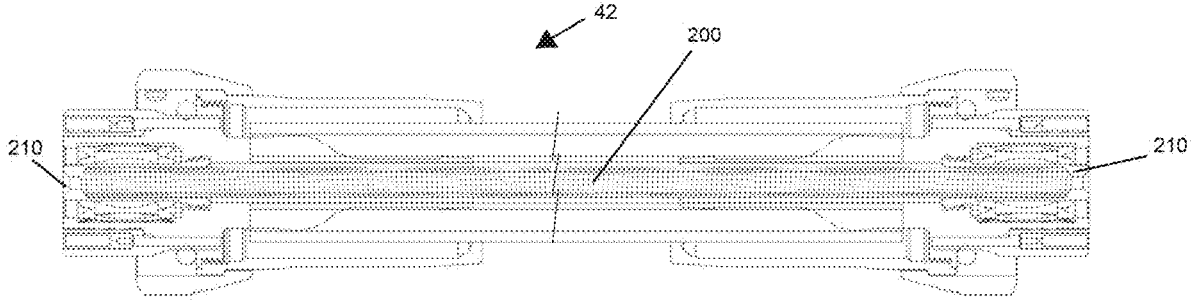

FIGS. 14A, 14B, and 14C depict additional assembly steps of the liner system, in accordance with the present invention. FIGS. 15A, 15B, and 15C depict further assembly steps of the liner system, in accordance with the present invention.

Figure 16A:
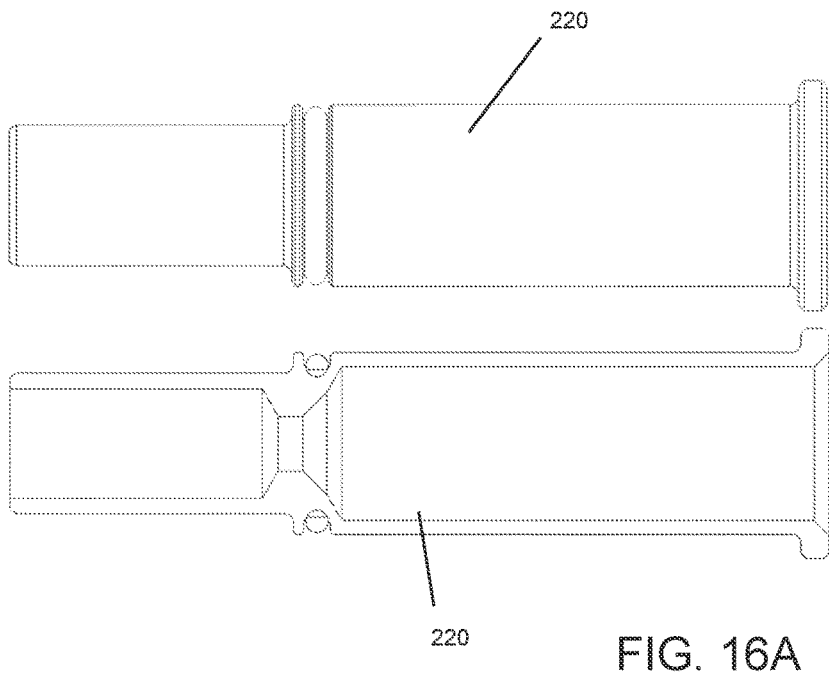
Figure 16B:
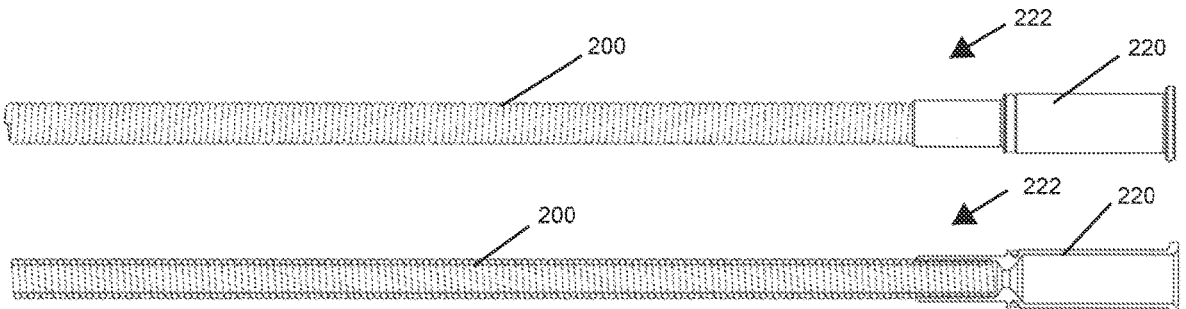

FIGS. 16A and 16B depict still further assembly steps of the liner system, in accordance with the present invention.

FIGS. 17A, 17B, and 17C depict yet further assembly steps of the liner system, in accordance with the present invention.

Figure 18A:
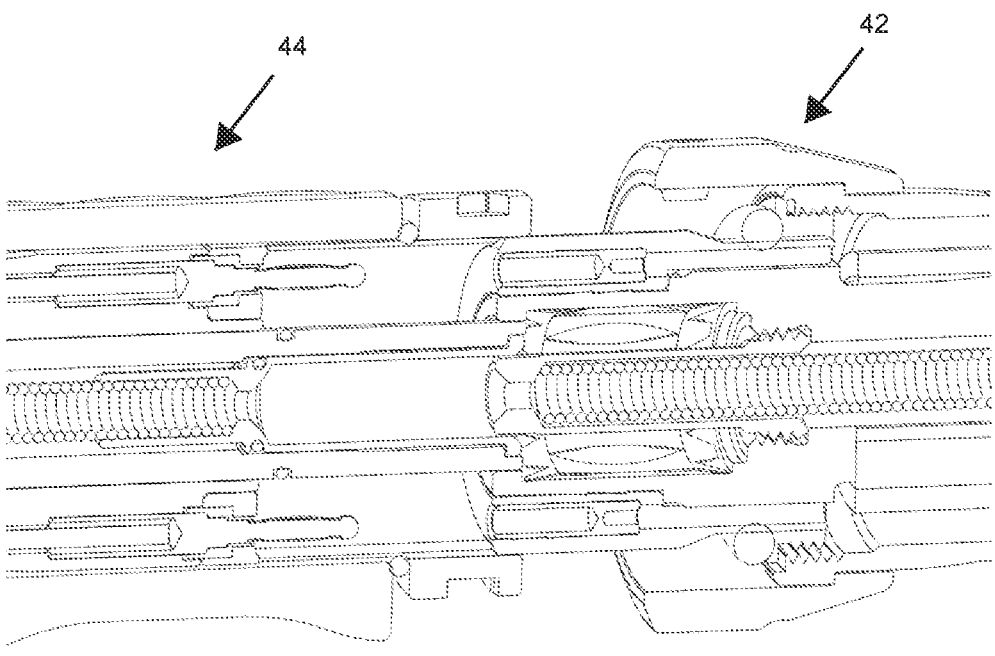
Figure 18B:
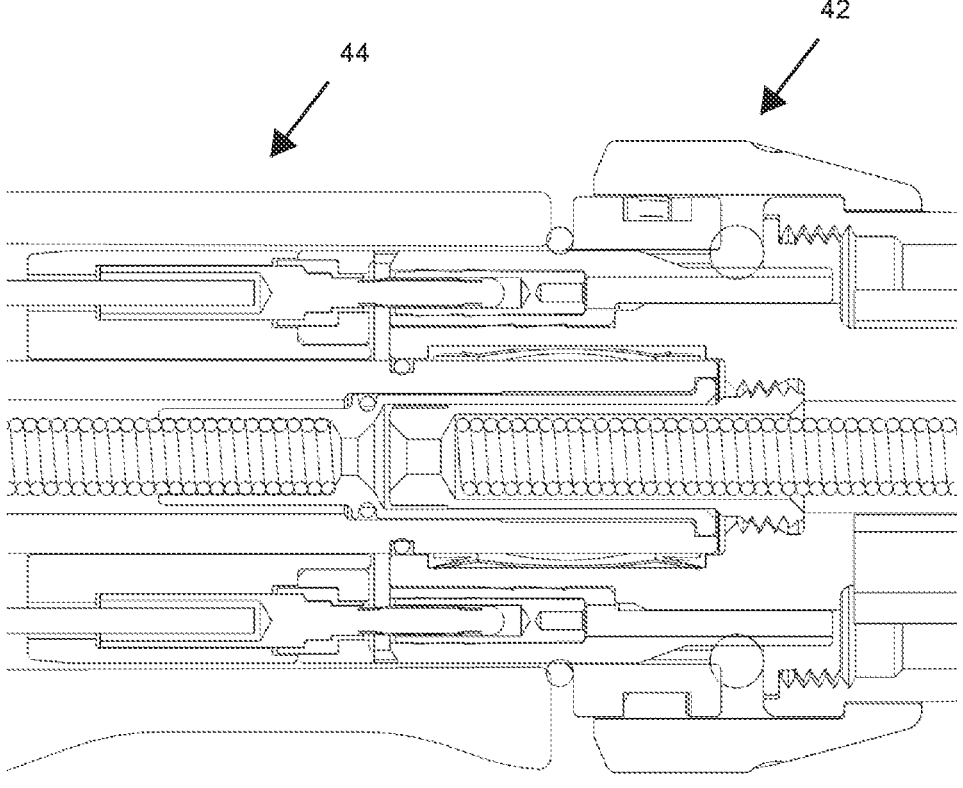

FIGS. 18A and 18B depict further additional assembly steps of the liner system, in accordance with the present invention.

Figure 19A:
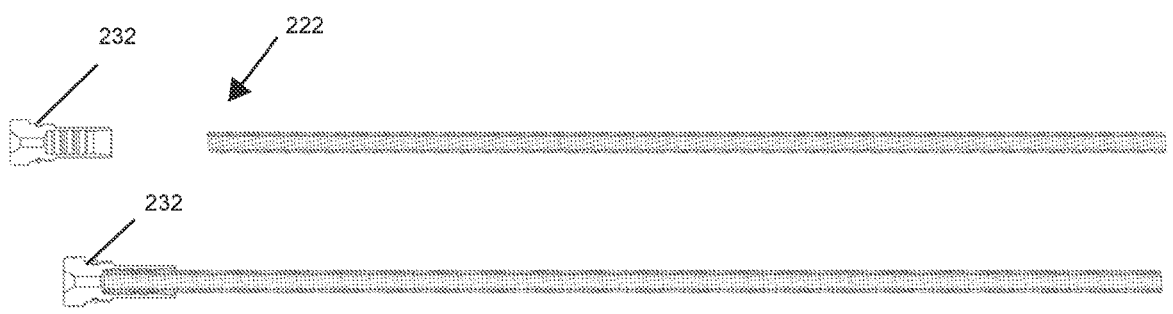
Figure 19B:
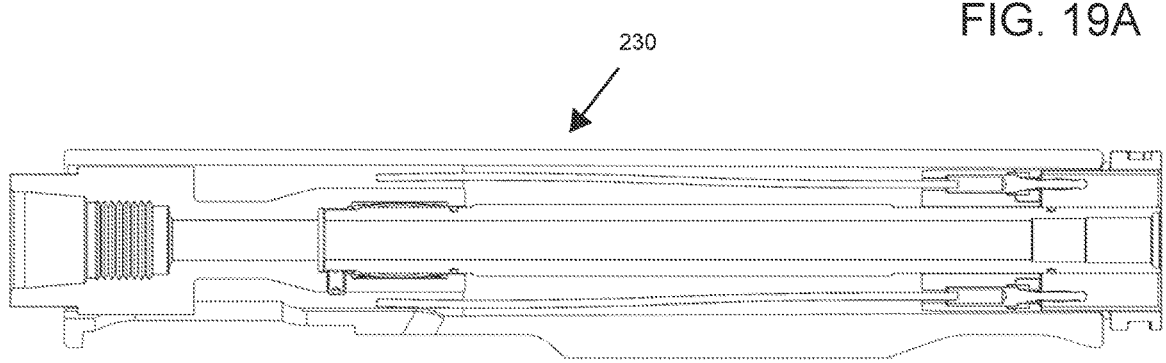
Figure 19C:
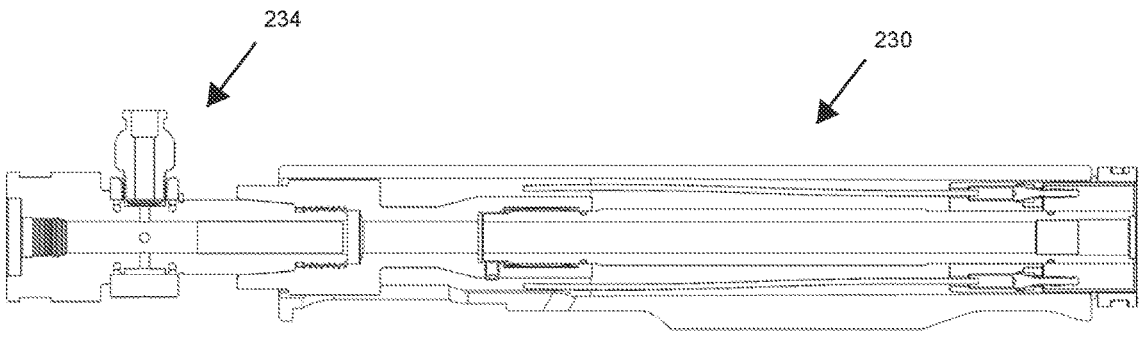

FIGS. 19A, 19B, and 19C depict assembly steps of the power pin handle, in accordance with the present invention.

Figure 20A:
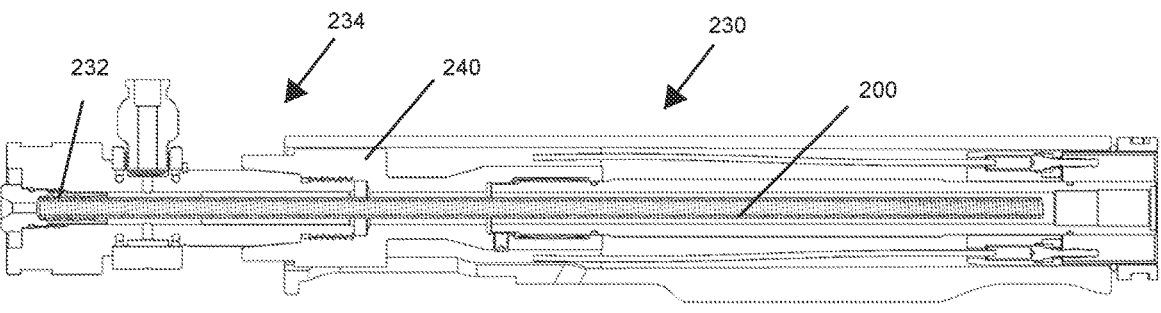
Figure 20B:
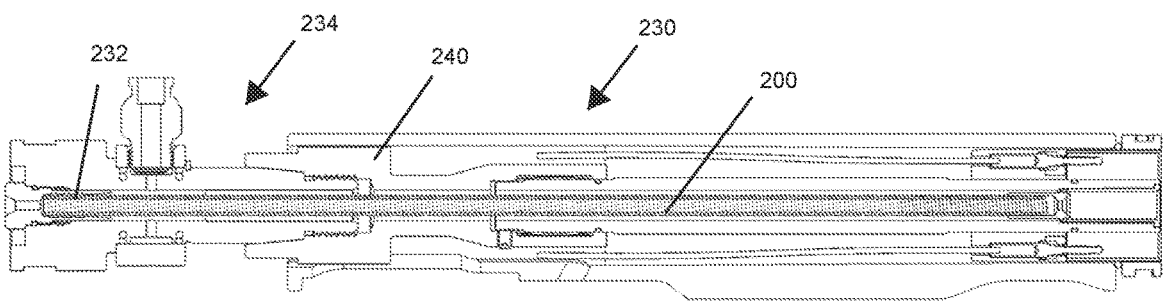
Figure 20C:
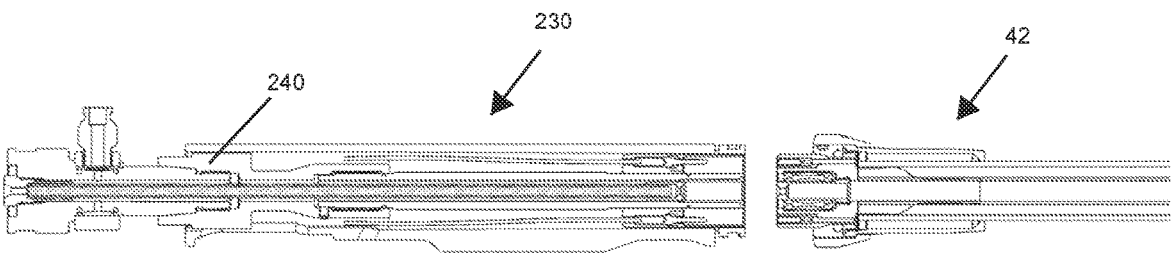

FIGS. 20A, 20B, and 20C depict further assembly steps of the power pin handle, in accordance with the present invention.

Figure 21A:
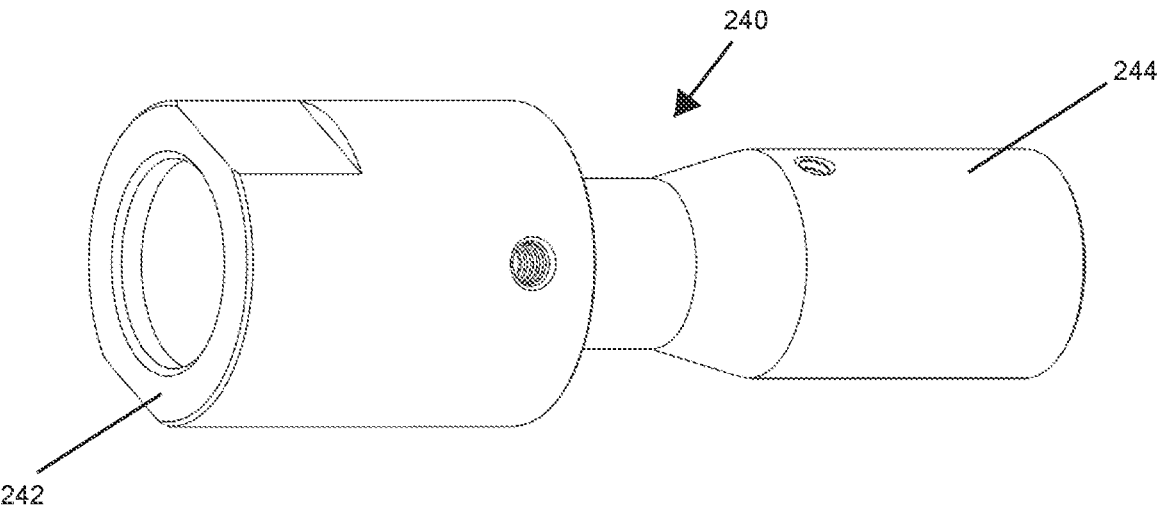
Figure 21B:
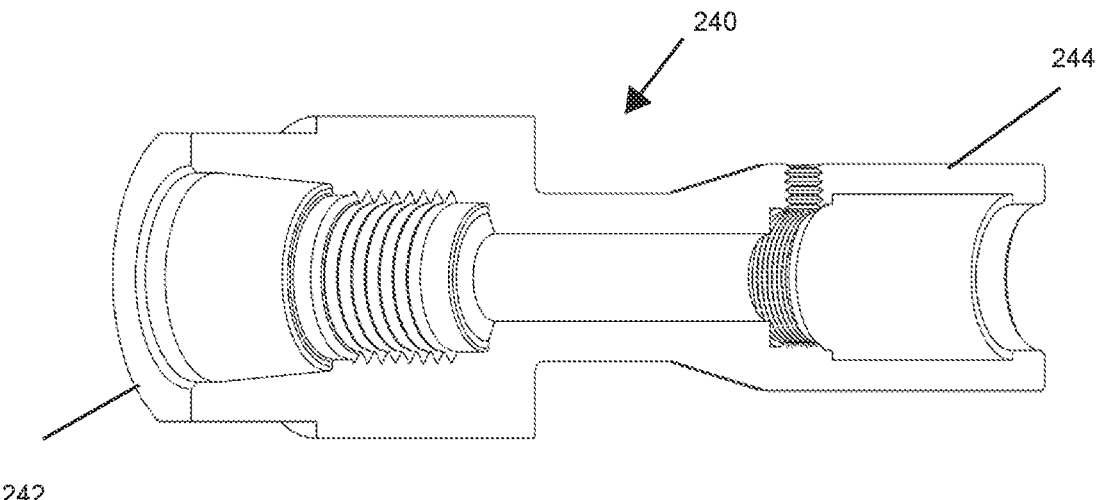

FIGS. 21A and 21B depict assembly steps of the transfer coupling, in accordance with the present invention.

Figures 22A, 22B, 22C:
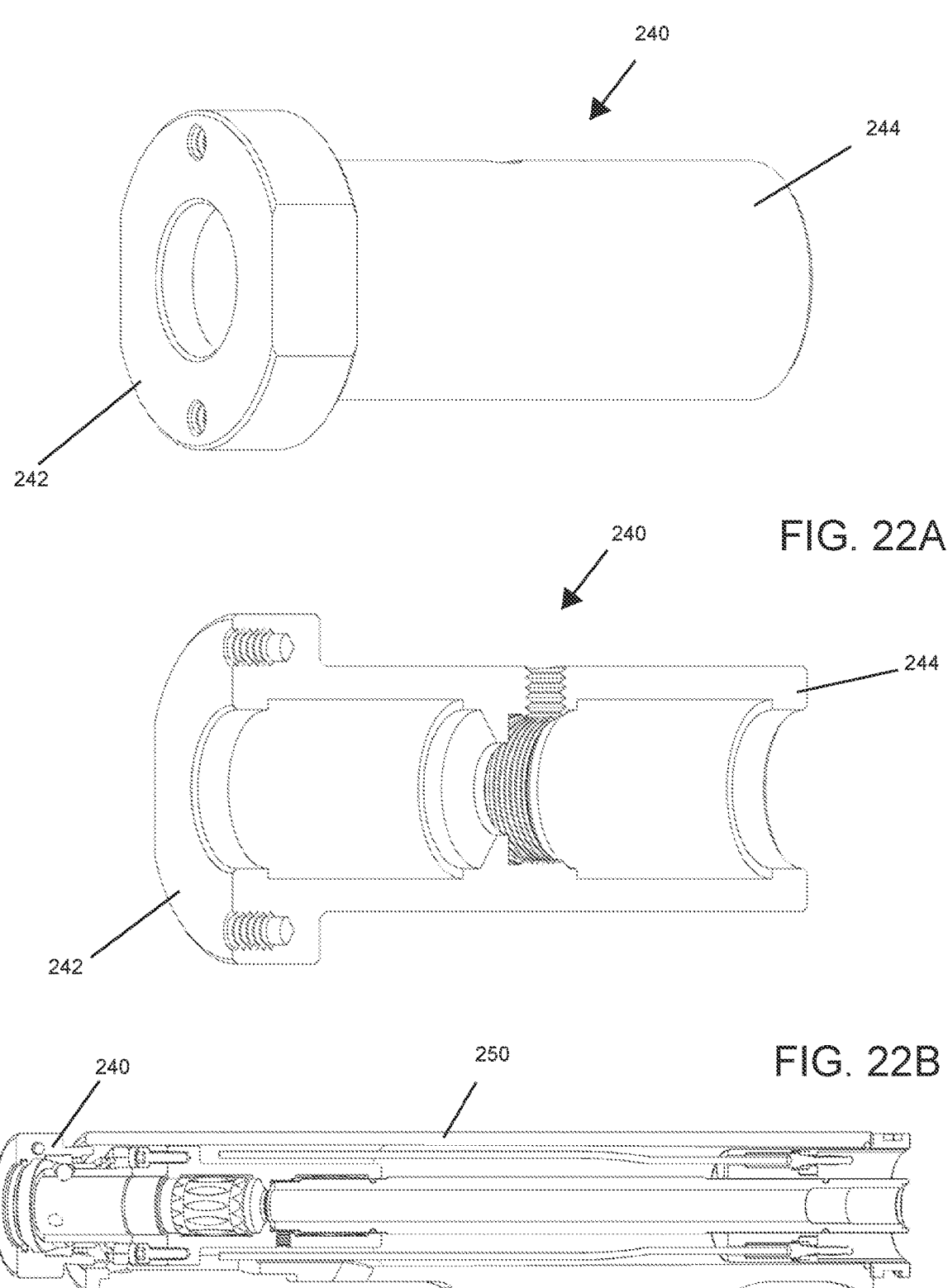

FIGS. 22A, 22B, and 22C depict further assembly steps of the transfer coupling, in accordance with the present invention.

Figures 23A, 23B:
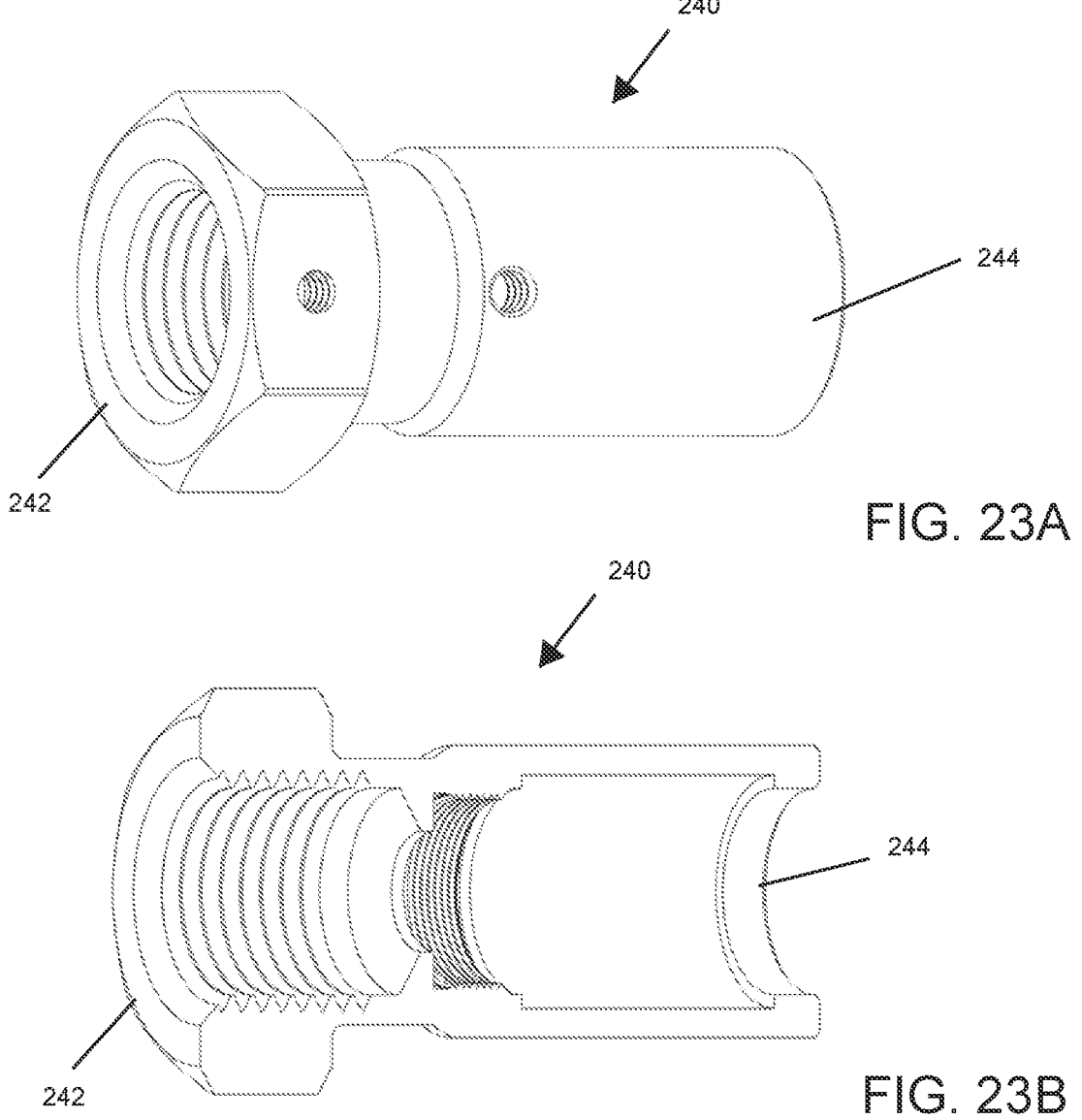

FIGS. 23A and 23B depict additional assembly steps of the transfer coupling, in accordance with the present invention.

VIV. DETAILED DESCRIPTION OF THE INVENTION

Figure 1:
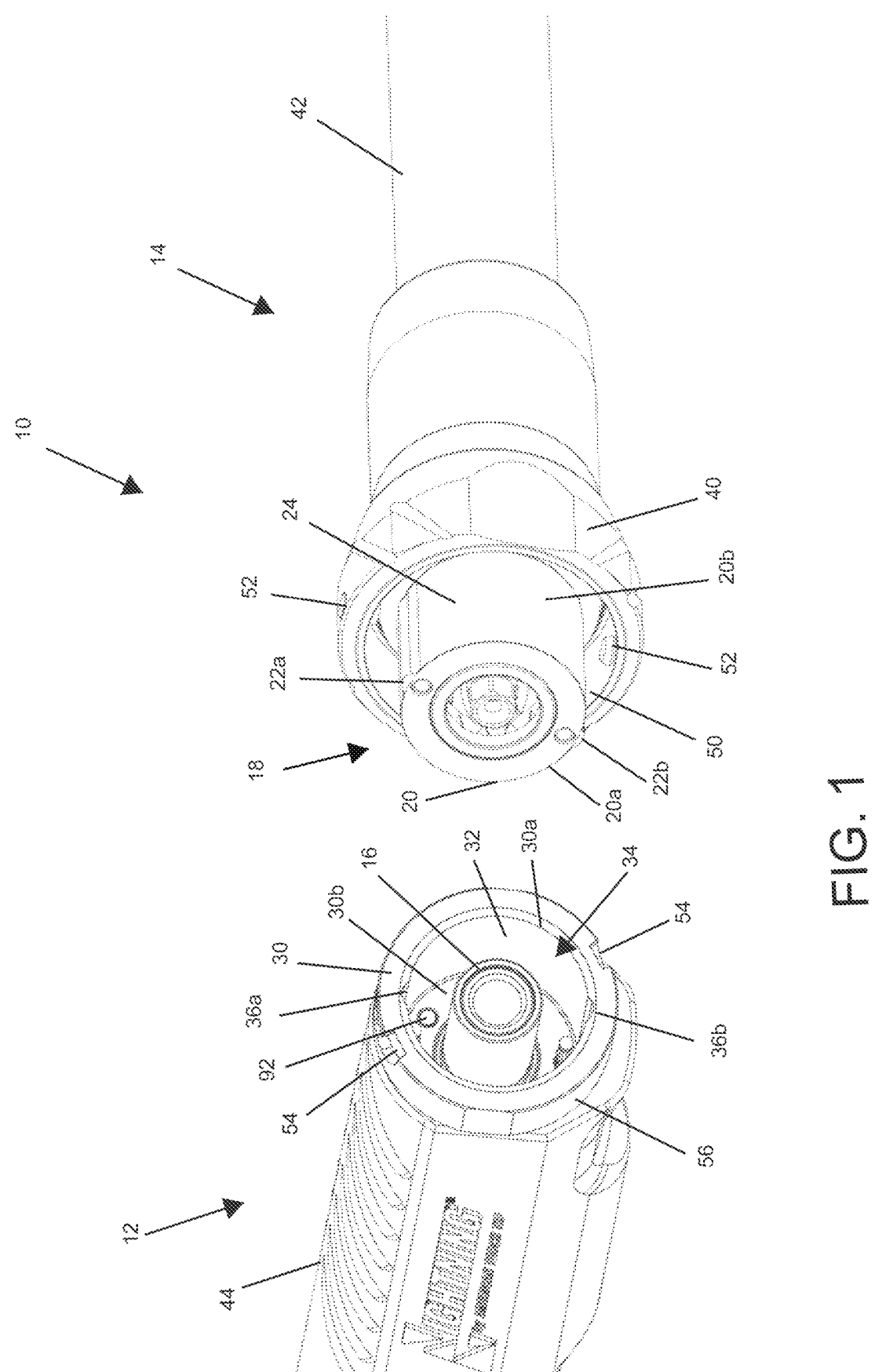
FIG. 1 depicts a detachable power connection, as deployed on a cable assembly and a gun assembly, in accordance with the present invention.
Figures 2A, 2B, 2C, 2D:
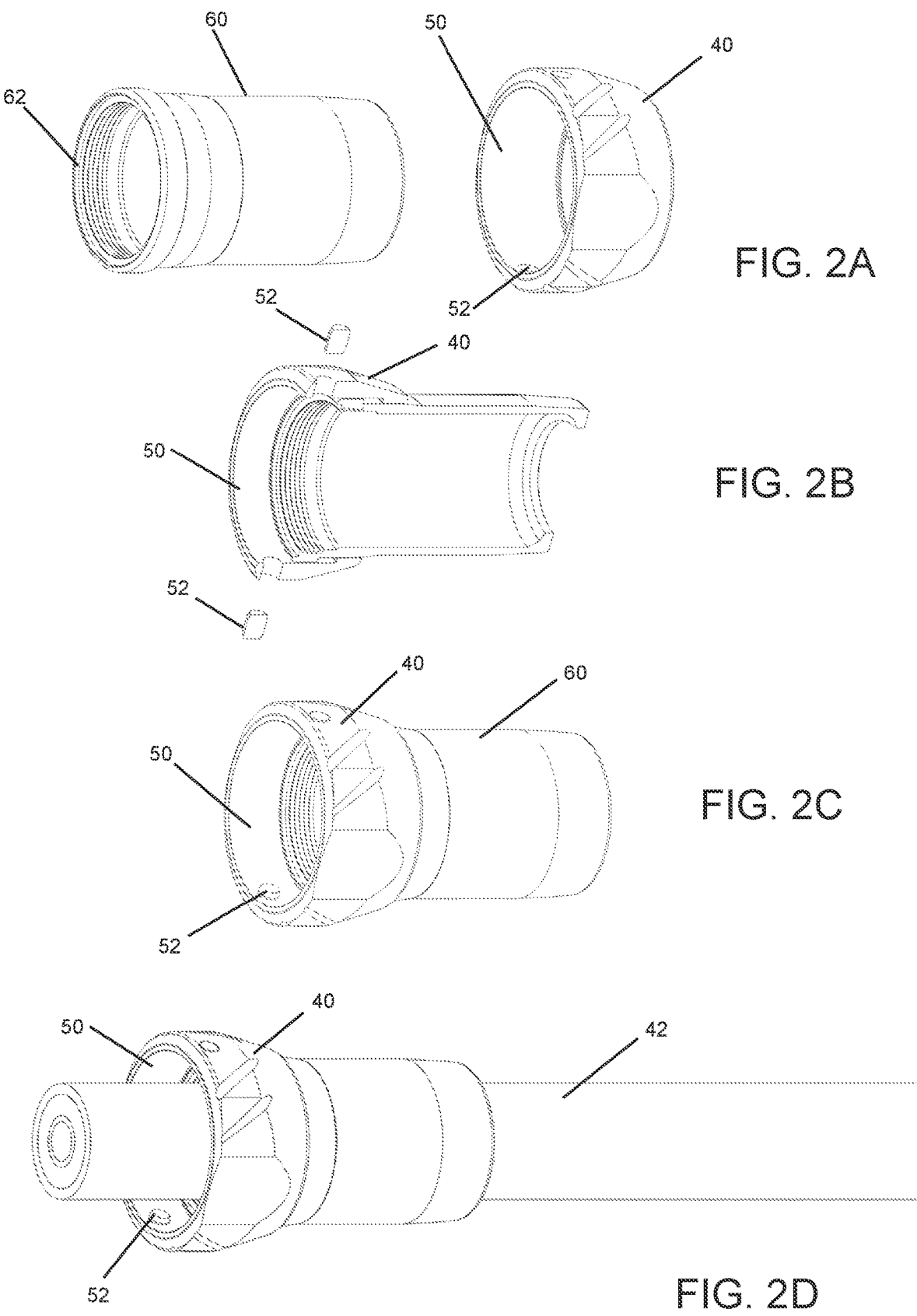
FIGS. 2A, 2B, 2C and 2D depict a series of assembly views of the components in a cable assembly, in accordance with the present invention.

Referring now to the drawings wherein the showings are for purposes of illustrating embodiments of the article only and not for purposes of limiting the same, and wherein like reference numerals are understood to refer to like components:

FIG. 1 generally depicts a detachable power connection 10 with particular applicability to a welding system in accordance with the present invention. A first connector 12 is provided for matingly connecting with a second connector 14. A male conductor 16 is retained within the first connector 12. The male conductor 16 is matingly received within a female conductor 18, retained within the second connector 14. An aligning insulator 20 is included with the second connector 14 for enclosing and internally retaining the female conductor 18. The aligning insulator 20 additionally includes one or more first alignment features 22a, 22b that are formed along an exterior surface 24 of the aligning insulator 20.

With continuing reference to FIG. 1, a locking body 30 is included with the first connector 12 for retaining the male conductor 16. The locking body 30 includes an interior surface 32 for defining an internal void 34 for matingly receiving the exterior surface 24 of the aligning insulator 20 therein. The locking body 30 additionally includes one or more second alignment features 36a, 36b formed along the interior surface 32 for matingly engaging the respective first alignment features 22a, 22b of the aligning insulator 20. A locking nut 40 is preferably formed onto the second connector 14, for releasably securing the first and second connectors 12, 14 together to form the detachable power connection 10. However, it is to be appreciated that other embodiments could be contemplated in which the locking nut 40 can alternatively be formed onto the first connector 12, as would readily occur to one having skill in the art, without departing from the invention.

With ongoing reference to FIG. 1, the male conductor 16, the female conductor 18, the aligning insulator 20, and the locking body 30 are of a generally cylindrical configuration and are configured to matingly receive their respective components in concentric alignment along a common cylindrical axis. As also shown in FIGS. 1, 2D, 4C, 5A, 5B, 5C, 11B and 12C of the present disclosure, the detachable power connection 10 is a component included with an electrical cable 42 having a first end and a second end and having identical connectors at each end. In the preferred embodiment, the identical connectors are preferably second connectors 14 as described hereinabove, for reversibly and interchangeably engaging with a respective first connector 12 on an arc welding torch handle 44. However, it is again to be appreciated that each type of connector could alternatively be formed on either the electrical cable 42 or the welding torch handle 44 without departing from the invention. Moreover, while only one end of the electrical cable 42 is explicitly depicted herewith, such cable designs having identical ends are ubiquitous in the art and the person having skill in the art would understand how to form such a dual-end cable from the present disclosure.

As specifically shown in FIGS. 1, 3B, 3C, 4A, 4B, 4C, 5A, 5B, 5C, 11B, and 12A, the first alignment features 22a, 22b formed along the exterior surface 24 of the aligning insulator 20 are preferably male protrusions 22a, 22b extending linearly from a forward end 20a to a rearward end 20b of the aligning insulator 20, which is to say, the male protrusions 22a, 22b are aligned in the direction of insertion of the second connector 14 into the first connector 12. It is to be understood that "forward end" refers to the end closest to the opposing connector, and "rearward end" refers to the end farthest from the opposing connector With specific reference to FIGS. 1, 6A, 6B, 7A, 7B, 7C, 11B, and 12A, the second alignment features 36a, 36b formed along the interior surface 32 of the locking body 30 are preferably female receptacles 36a, 36b extending linearly from a forward end 30a to a rearward end 30b of the locking body 30, where it is again to be understood that "forward end" refers to the end closest to the opposing connector, and "rearward end" refers to the end farthest from the opposing connector. In other words, the female receptacles 36a, 36b are also aligned in the direction of insertion of the second connector 14 into the first connector 12 for matingly engaging the respective male protrusions 22a, 22b.

As shown in the aforementioned figures, the male protrusions 22a, 22b are preferably a pair of generally concave half-cylindrical protrusions each formed on opposing sides of the exterior surface 24 of the aligning insulator 20, which is to say, 180 degrees apart along the cylindrical exterior surface 24. Correspondingly, the female recesses 36a, 36b are preferably a pair of generally convex half-cylindrical recesses each formed on opposing sides of the interior surface 32 of the locking body 30. It is to be appreciated that protrusions and recesses having profiles other than half-cylinders and having different lengths and orientations from that described hereinabove could also be contemplated without departing from the invention.

With reference to FIGS. 1, 2A, 2B, 2C, 2D, 4C, 5A, 5B, 5C, 11A, 12A, 12B, and 12C, the locking nut 40 is preferably retained on the second connector 14 and includes an interior surface 50 having a protruding lock feature 52 for engaging with a recessed lock channel 54 formed on an exterior surface 56 of the first connector 12. These components are configured such that the first connector 12 and the second connector 14 are securely retained by engagement of the lock feature 52 with the lock channel 54.

With ongoing reference to FIGS. 1, 2A, 2B, 2C, 2D, 4C, 5A, 5B, 5C, 11B, 12A, 12B, and 12C, the locking nut 40 can include a pair of lock features 52 (in the form of dowel pins) at opposing sides, that is, 180 degrees apart along the inner circumference of the interior surface 50 of the locking nut 40, which matingly engage a pair of corresponding opposed lock channels 54. In the preferred embodiment, the lock channel 54 includes a slanted portion for guiding the lock feature 52. The lock channel 54 is open along the periphery of the exterior surface 56 and then slants in a diagonal direction along the periphery and includes a retaining notch to securely hold the lock feature 52. In this manner, the locking nut 40 enables the first and second connectors 12, 14 to be securely retained by at least a partial turn of the locking nut 40.

Further additional features of the present invention are now set forth in connection with the assembly figures from FIGS. 2A through 12C, which depict aspects of a quick-change cable having multiple connection points which allows for the ability to quickly and easily replace a power cable (preferably for a welding system) due to damage or length change. The present detachable power cable provides a connection that is sealed and protected from environment. It also accommodates multiple sets of trigger wires, a changeable cable, and a liner that can be inserted from either end.

FIGS. 2A through 5C depict assembly aspects of the present cable assembly. As shown in FIGS. 2A, 2B, 2C, and 2D, the locking nut 40 is slid over a crimp insulator 60. As shown in FIG. 2B, the lock features 52 are pressed into the locking nut 40 after sliding the locking nut 40 onto the crimp insulator 60. The locking nut 40 aligns along the crimp insulator 60 via pins and a milled slot and snaps over a press-lip 62 at the end of the crimp insulator 60. Afterwards, the assembled locking nut 40 and crimp insulator 60 are attached and slid along onto the electrical cable 42.

As shown in FIG. 3A, auxiliary receivers 70 are provided to transfer trigger signals for selectively activating the welding gun. Each auxiliary receiver 70 receives a trigger wire 72 which is soldered there into. As shown in FIG. 3B, the soldered auxiliary receivers 70 with trigger wires 72 are inserted into front holes 74 formed in the aligning insulator 20. The auxiliary receivers 70 include barbs along their exterior surfaces to enable a barbed press fit into the front holes 74 to ensure they cannot be removed. In the assembled view of FIG. 3C, the aligning insulator 20 is shown with the auxiliary receivers installed.

As shown in FIG. 4A, the aligning insulator 20 is pressed over a power connection barb 76 and aligned to ensure that three radial holes 78a are in line with corresponding holes on the aligning insulator 20. Once pressed together, as shown in FIG. 4B, the power connection barb 76 has barbs along its exterior surface that keep the aligning insulator from possible removal. As explained hereinabove, the female conductor 18 is defined by an open end in the power connection barb 76 in which the male conductor 16 is matingly received. The three holes 78b around the aligning insulator 20 are then filled with epoxy to prevent future rotation. As shown in FIG. 4D, a crimp is prepared by sliding an Oetiker clamp 80 and crimp ring 82 over the electrical cable 42. A conductive element 84 and connecting trigger wires 86 are exposed from the end of the electrical cable 42.

As shown in FIG. 5A, the power connection barb 76 and assembly is inserted into the electrical cable 42 to make an electrical connection with the conductive element 84. The crimp ring 82 is slid over the crimp region, after which the crimp ring 82 is crimped. The Oetiker clamp 80 is then crimped in over the power connection barb 76, and the trigger wires 72, 86 are respectively soldered together. Afterwards, the entire assembly is insulated with electrical tape, which is then heat shrinked. As shown in FIG. 5B, the locking nut 40 an assembly is slid over the crimp region and the crimp insulator 60 is threaded onto the power connection barb 76. A compression O-ring 88 is installed over the aligning insulator 20.

As shown in FIG. 5C, a power-conducting contact spring 90 is installed inside the female conductor 18 as defined by then open end in the power connection barb 76. In the preferred embodiment, the power-conducting contact spring 90 is a Louvertac contact spring in which electrical power is transferred from the electrical cable 42 to the torch body through this Louvertac contact spring. Upon assembly, as further illustrated in the remaining figures, the power-conducting contact spring 90 is received over the male conductor 16 when matingly received within the female conductor 18 for connecting and facilitating electrical conduction between the male conductor 16 and the female conductor 18. It is to be appreciated that the steps as shown in FIGS. 2A through 5C and explained hereinabove are repeated on the other side of the electrical cable 42 in order to make each end of the electrical cable 42 identical and thereby produce a completed cable assembly.

As shown in the present figures, for any drawing figures depicting loose or unconnected wires within the unassembled handle, it is to be appreciated that these wires are later connected to a trigger switch in a finally assembled component, in accordance with standard assembly techniques routinely practiced in the art. Such wires are not left unconnected within the handle as could possibly be inferred by the figures, as would be understood by those skilled in the art. FIGS. 6A through 10C depict assembly aspects of the present gun assembly. As shown in FIG. 6A, auxiliary contacts 92 are provided to transfer the trigger signals for selectively activating the welding gun. Each auxiliary contact 92 receives a trigger wire 94 which is soldered there into. Each auxiliary contact 92 also receives a power-conducting contact spring 96 (preferably a Louvertac) for connecting and facilitating electrical conduction between the auxiliary contacts 92 and the respective auxiliary receivers 70 into which they are matingly received upon assembly, as further illustrated in the remaining figures. Upon assembly, the auxiliary contacts 92, as paired with the power-conducting contact spring 96 and the auxiliary receivers 70, are used to transfer trigger signals for activating the welding gun.

As shown in FIG. 6B, contact insulators 100 are installed over the auxiliary contacts 92 with power-conducting contact springs 96. As shown in FIG. 6C, the trigger wires 94 of the auxiliary contacts 92 are passed through and then seated in respective suitable passageways 102 of an aligning insulator 110. As shown in FIG. 7A, the assembled aligning insulator 110 is joined to the locking body 30. As shown in FIGS. 7B and 7C, the aligning insulator 110 is installed to the locking body 30 using two 5-40×½″ shop socket head screws (SHCS's) 112 which are received and retained by threaded holes 114 formed in the aligning insulator 110 and the locking body 30, retaining the insulated auxiliary contacts 92.

It is to be appreciated that signal wires 94 are connected to the auxiliary contacts 92 preferably retained in the locking body 30, for carrying the trigger signal. And preferably the auxiliary receivers 70 are retained in the aligning insulator 20 for connecting with the respective auxiliary contact 92 to carry the trigger signal. Of course, it is to also be appreciated that a reverse arrangement could alternatively be contemplated in which the auxiliary contacts 92 are retained in the aligning insulator 20 and the auxiliary receivers 70 are retained in the locking body 30, all without departing from the invention. While any suitable number of contacts 92 and auxiliary receivers 70 could be contemplated, the preferred embodiment includes a pair of male auxiliary contacts 92 for connecting to a respective pair of female auxiliary receivers 70 via a respective pair of power-conducting contact springs 96.

As shown in FIG. 8A, two helicoils 116 are installed into radial holes 118 of the aligning insulator 110. As shown in FIG. 8B, the coupling neck 120 of the welding gun is slid into the locking body 30 and assembly. A pair of dimples 122 formed onto the exterior surface of the coupling neck 120 can be provided for removable engagement of the coupling neck 120 with the helicoils 116. However, a pair of slots 124 could alternatively be provided on the surface of the coupling neck 120 instead of dimples 122 to allow for partial rotatability of the electrical cable 42 in the handle 44, thereby relieving wrist strain. In any event, the coupling neck 120 is slid into the locking body 30 and associated assembly. As shown in FIG. 8C, a pair of cup-point set screws 126 are tightened through the helicoils 116 into the dimples 122 (or slots 124) on the coupling neck 120 in order to securely hold it in place.

FIG. 9A shows the assembled locking body 30 and assembly with the coupling neck 120 attached. A transfer coupling 130 (having an installed gooseneck receiver 132) is provided and is brought together with the coupling neck 120 from each side of the handle 44 of the welding gun. As shown in FIG. 9C, the components are threaded together until properly oriented. A set screw 134 is tightened through the handle 44 and a thread in the transfer coupling 130 to lock in place. The handle 44 is hollow to allow passage of the trigger wires 94.

FIG. 10 shows the assembled quick disconnect handle 44 is shown with a FLASH gooseneck 140 installed into the transfer coupling 130. Other alternative embodiments could include an assembled quick disconnect handle 44 adapted to a standard gooseneck or an assembled quick disconnect large curve handle equipped with a curved FLASH.

In the cutaway view of FIG. 12A, the lengths of the components are designed so that the alignment features 22a, 22b, 36a, 36b properly orient the components prior to the engagement of the auxiliary contacts 92 with the auxiliary receivers 70, preventing damage of these small components in the event of an improperly aligned insertion. FIG. 12B is a cutaway view that shows the two self-aligned first and second connector assemblies 12, 14 being brought together and locked via a partial turn of the locking nut 40. Compressive forces on the large O-ring 88 maintain a firm lock between the first and second connectors 12, 14. FIG. 12C is an assembled view showing the handle 44 and cable 42 attached.

With reference to FIGS. 13A through 18B, a liner system is disclosed herewith. GMAW torches and cables typically utilize a liner 200 to transport the welding wire to the contact tip. This liner 200 is typically continuous from the power pin to the contact tip, with the exception of systems that utilize front load liners and/or stub liners. The liner 200 of the present invention is reversible within the electrical cable 42, can be installed from either side, and is received by "stub" portions within the handle and power pin.

With continued reference to FIGS. 13A through 18B, the liner 200 of the present invention is beneficial for further facilitating the reversibility of the electrical cable 42 in the event of wear at either end of the electrical cable 42. Since the liner 200 is fully contained within the reversible electrical cable, the liner 200 never has to be removed upon reversal. Both ends of the electrical cable 42 are identical and the liner 200 is adapted to receive "stub" portions of the liner 200 extending from both the power pin and the torch handle.

With ongoing reference to FIGS. 13A through 18B, the present liner 200 is made from two machined components along with a standard GMAW metal liner, a threaded cap 210 and a liner receiver 220. As shown in FIG. 13A, the threaded cap 210 is made from stainless steel and an external thread 212 and a hexagonal end 214, both of which are used for assembly. As shown in FIG. 13B, the threaded cap 210 is inserted into and through the bore of the power connection barb 76. As shown in FIG. 13C, the threaded cap 210 is threaded into place into the power connection barb 76 on one end of the electrical cable 42 to be fully installed within the power connection barb 76.

As shown in FIG. 14A, the liner 200 (which may be a steel liner) is fed through the electrical cable assembly from the other end of the electrical cable 42, which is the end without a threaded cap yet to be installed. As shown in FIG. 14B, from the opposite second end of the electrical cable 42, the liner 200 (which may be a metal liner) is continually fed through the electrical cable 42 until it enters the threaded cap 210 at the original first end. The liner 200 is then seated inside the threaded cap 210 in the first end. As shown in FIG. 14C, with the liner 200 seated in the threaded cap 210 at the original first end of the electrical cable 42, it is cut at a designated location to a desired stick-out length at the opposite second end of the electrical cable 42.

As shown in FIG. 15A, the second end of the electrical cable 42 is depicted with the liner 200 cut to the desired length. This length is approximately flush to the outermost face of the electrical cable 42, which can be the forward end 20a of the aligning insulator 20. As shown in FIG. 15B, a corresponding second threaded cap 210 is installed at the second end, which is threaded over the liner 200, thereby trapping the liner 200 within the electrical cable 42 in a compressed state between the two threaded caps 210. FIG. 15C shows the reversible electrical cable 42 with the liner 200 installed such that both ends are identical.

FIG. 16A shows side and side cutaway views of the receiver 220, which is the second of the two aforementioned machine components. The threaded caps 210 on each end of the electrical cable 42 are configured to enter into the receiver 220. The receiver 220 is preferably made from stainless steel and is configured to receive the threaded cap 210. The receiver 220 is installed into both the power pin and torch handle (explained in detail hereinbelow), thus further enabling the reversibility of the electrical cable 42.

As shown the side and side cutaway views of FIG. 16B, a stub portion 222 of the liner 200 is cut to a desired size and permanently affixed to the liner 200 via crimping to the receiver 220. Another benefit of having stub portions 222 and a reversible cable 42 is that no cumbersome disconnections from the wire feed need to be made to change the electrical cable 42. It is sufficient to simply leave the power pin handle connected to the wire feed and disconnect the reversible electrical cable 42 from the power pin handle, cut the welding wire, and connect a new cable.

As shown in FIG. 17A, the stub liner 222 and receiver 220 are slidingly installed into the back side of the handle 44. The cutaway view of FIG. 17B shows the stub liner 222 and receiver 220 installed in the handle 44. FIG. 17C shows the electrical cable 42 and handle 44 brought together to attach together with the liner components nested inside.

As shown in FIG. 18A, as the electrical cable 42 is installed into the handle 44, the threaded cap 210 enters into the receiver 220. A cross section view is shown in FIG. 18B of the electrical cable 42 installed onto the handle 44. FIGS. 19A through 20C depict the power pin handle 230 in accordance with the present invention. The liner interface with the power pin end of the electrical cable 42 is much like the interface with the torch handle. In the power pin handle 230, the components are assembled similarly to the torch handle 44, only one end is configured to connect with a wire feed instead of a gooseneck. The opposite end of the electrical cable 42 is the same exact quick connect mechanism as the torch handle 44.

As shown in FIG. 19A, to install the stub liner system 222 in the power pin handle 230, a stub portion 222 of liner is crimped into a brass ferrule 232. In the power pin handle 230 shown in FIG. 19B, the front is identical to the back of the torch handle 44. The back is configured with a power pin receiver connected to the coupling neck as shown in FIG. 19C. As shown in FIG. 20A, the brass ferrule 232 and liner 200 are inserted into a power pin 234 that is connected to the back of the power pin handle 230 and are threaded into place. The stub portion 222 extends to nearly the other end of the electrical cable 42 where it is simply received by the same liner receiver that is located in the torch handle assembly 44. As shown in FIG. 20B, the liner receiver is inserted into the front end of the power pin handle 230 to receive the liner 200. In this location, it merely slides over the liner 200 and it is not crimped. After inserting this piece, the liner 200 is installed and the power pin handle 230 is ready to receive the quick connect cable 42. As shown in FIG. 20C, the power pin handle 230 is now ready to connect to the wire feed and also receive the reversible electrical cable 42.

FIGS. 21A through 23C depict the transfer coupling 240 in accordance with the present invention. FIGS. 21A and 21B respectively show oblique and oblique cross-sectional views of the transfer coupling 240 configured for receiving the power pin 234. The transfer coupling 240 is located inside the power pin handle 230 and has two ends configured to join two components. In all cases, a first end 242 one end receives a coupling neck, which is a copper tube that spans from one end of the handle 230 to the other and is used to carry all gasses and power between halves. The opposite second end 244 of the transfer coupling 240 is configurable to receive a number of different components. In the power pin handle 230 described hereinabove, the transfer coupling 240 is configured to receive a power pin 234. In the torch handle 44, a transfer coupling 240 can be configured to receive different types of goosenecks, including the present assignee's patent pending design for a FLASH quick connect gooseneck with a non-conductive coupling.

FIGS. 22A and 22B show a type of transfer coupling 240 configured for a quick-disconnect gooseneck. FIG. 23C shows a transfer coupling 240 assembled with a quick-disconnect gooseneck coupling 250. FIGS. 23A and 23B depict a type of transfer coupling 240 configured for a traditional type of gooseneck. Other types of components could also be coupled using the present transfer couplings 240 as would occur to those skilled in the art.

Another aspect of the invention is the ability to stitch multiple cable segments together, similar to an extension cord. A shorter segment of the reversible electrical cable (6 feet long for example) can be attached to the electrical cable using a two-sided female coupler with both ends being similar to a female port of the quick-change handle. This can be utilized as a temporary cable extension when the user needs to reach further distances, and it can be removed when it is no longer needed, returning the electrical cable back to an original, shorter length. This can be advantageous because a short cable is less liking to experience issues with gas flows and wire feeder entanglements. Replacing a cable that is shorter than what would have been previously needed by an end-user to reach far welds will also result in cost savings in the long run.

As described hereinabove, the present invention is a quick-change cable device with multiple connection points that allows for quick and easy replacement of electrical welding cables. The invention allows for quick and easy disconnection and reconnection of the electrical cable to and from a torch handle and a wire feeder. The power connection is the same on each end of the quick-change cable device, and the power pin handle and the torch handle are both adapted to quickly attach to the power connection. The invention also provides a torch handle and gun assembly adapted to attach to the quick-change cable assembly. The present invention thus provides a detachable power connection that may be reversibly affixed at either the back of the torch handle or at the rear of the electrical cable before the power connection to a wire feeder. The present invention advantageously allows for quick disconnection and reconnection of the electrical cable to and from the handle and the wire feeder. This allows the user to replace broken cables, reverse cables to extend their life, attach cables of different power rating to one handle, safety secure and store the handle when not in use, and even personalize the handle.

The present invention provides many benefits over previous type systems, including:

Extending cable life;

Reversible cable, since wear typically occurs on one end more than the other;

Cost reduction since only the electrical cable can be replaced instead of the system in the event of damage;

Similarly, only a handle need be replaced in the event of handle damaged;

Reduction in down time while swapping either the handle or the electrical cable;

Reduction in down time by quickly swapping the electrical cable without opening the wire feeder;

Reduction in down time by changing the liner without opening the wire feeder;

Enables switching between welding amperages by changing the electrical cable and keeping the same handle;

Thinner cables at lower amperages are lighter and thus result in less wrist fatigue;

Provides inventory control by enabling user-assigned handles with shared cable;

Helps track which operators are roughly using the equipment, resulting in damage;

Provides a personalized handle, creating a sense of pride/ownership for the users; and Partial rotatability of the handle reduces wrist fatigue.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A detachable power connection, comprising:
a first connector for matingly connecting with a second connector;
a male conductor, retained within the first connector, the male conductor matingly received within a female conductor, retained within the second connector;
an aligning insulator of the second connector for enclosing and internally retaining the female conductor, further comprising at least one first alignment feature formed along an exterior surface of the aligning insulator;
a locking body of the first connector for retaining the male conductor, the locking body comprising an interior surface for defining an internal void for matingly receiving the exterior surface of the aligning insulator therein, the locking body comprising at least one second alignment feature formed along the interior surface for matingly engaging the respective at least one first alignment feature of the aligning insulator; and
a locking nut formed onto one of the first connector or second connector, for releasably securing the first and second connectors together to form the detachable power connection;
at least one signal wire connected to an auxiliary contact retained in one of the aligning insulator or the locking body, for carrying a trigger signal, and further comprising at least one auxiliary receiver retained in the respective other of the aligning insulator or the locking body, for connecting with the respective auxiliary contact to carry the trigger signal.

2. The detachable power connection of claim 1, wherein the male conductor, the female conductor, the aligning insulator, and the locking body are of a generally cylindrical configuration and are configured to matingly receive their respective components in concentric alignment along a common cylindrical axis.

3. The detachable power connection of claim 1, further comprising a reversible cable having a first end and a second end and having identical second connectors at each end for reversibly and interchangeably engaging with the detachable power connection first connector;
wherein the first connector is disposed on one of an arc welding torch handle or a power pine handle.

4. The detachable power connection of claim 3, further comprising a liner for transporting welding wire and extending continuously within the reversible cable, wherein the liner includes first and second ends that are received and retained within respective first and second threaded caps each retained in the respective identical second connectors of the reversible cable.

5. The detachable power connection of claim 4, further comprising a receiver, installed into at least one of the arc welding torch handle or the power pin handle, configured to receive the threaded cap, and thereby permit entry of the welding wire.

6. The detachable power connection of claim 4, wherein each threaded cap is configured to be inserted into and through a bore of a power connection barb at each end of the reversible cable.

7. The detachable power connection of claim 1, wherein the at least one first alignment feature formed along the exterior surface of the aligning insulator comprises at least one male protrusion extending linearly from a forward end to a rearward end of the aligning insulator, and wherein the at least one second alignment feature formed along the interior surface of the locking body comprises at least one female receptacle extending linearly from a forward end to a rearward end of the locking body for matingly engaging the respective male protrusion.

8. The detachable power connection of claim 7, wherein the at least one male protrusion comprises a pair of generally concave half-cylindrical protrusions each formed on opposing sides of the exterior surface of the aligning insulator, and wherein the at least one female recess comprises a pair of generally convex half-cylindrical recesses each formed on opposing sides of the interior surface of the locking body.

9. The detachable power connection of claim 1, wherein the locking nut is retained on the second connector and comprises an interior surface having at least one protruding lock feature for engaging with at least one respective recessed lock channel formed on an exterior surface of the first connector, such that the first connector and second connector are securely retained by engagement of the at least one lock feature with the at least one lock channel.

10. The detachable power connection of claim 9, wherein the at least one lock channel includes a slanted portion for guiding the respective lock feature, to enable the first and second connectors to be securely retained by at least a partial turn of the locking nut.

11. The detachable power connection of claim 1, further comprising a power-conducting contact spring received over the male conductor when matingly received within the female conductor for connecting and facilitating electrical conduction between the male conductor and the female conductor.

12. The detachable power connection of claim 1, wherein the female conductor comprises a power connection barb in which the male conductor is matingly received.

13. The detachable power connection of claim 1, wherein the at least one auxiliary contact comprises a pair of male auxiliary contacts for connecting to a respective pair of female auxiliary receivers via a respective pair of power-conducting contact springs.

14. A welding system, comprising:

an arc welding torch handle removably connected to an electrical cable having a first end and a second end, and having identical cable connectors at each end for reversibly and interchangeably engaging with a handle connector on the arc welding torch handle;

a detachable power connection, wherein the identical cable connectors and the handle connector each respectively comprise one of a first connector or a second connector for matingly connecting to each other, wherein the detachable power connection further comprises:

a cylindrical male conductor, retained within the first connector along a cylindrical axis, the male conductor matingly received within a cylindrical female conductor, concentrically retained within the second connector along the cylindrical axis;

a cylindrical aligning insulator of the second connector for enclosing and internally retaining the cylindrical female conductor along the cylindrical axis, further comprising a pair of male protrusions formed on opposing sides along an exterior surface of the aligning insulator;

a cylindrical locking body of the first connector for retaining the cylindrical male conductor along the cylindrical axis, the cylindrical locking body comprising an interior surface for defining an internal void for matingly receiving the exterior surface of the cylindrical aligning insulator therein, the cylindrical locking body comprising a pair of female recesses formed on opposing sides along the interior surface for matingly engaging the respective pair of male protrusions of the cylindrical aligning insulator; and a locking nut formed onto one of the first connector or second connector, for releasably securing the first and second connectors together to form the detachable power connection, wherein the locking nut is retained on the second connector and comprises a cylindrical interior surface having a protruding lock feature for engaging with a recessed lock channel formed on a cylindrical exterior surface of the first connector, such that the first connector and second connector are securely retained by engagement of the lock feature with the lock channel.

15. A reversible electrical cable, comprising:

a cable first end and a cable second end, wherein the cable first and second ends each end includes an identical cable connector for reversibly and interchangeably engaging with a corresponding connector on one of an arc welding torch handle or a power pin handle, wherein each of the identical cable connectors are configured to releasably secure the corresponding connector together to form a detachable power connection, wherein the identical cable connectors are one of a first connector or a matingly connectible second connector, and wherein the corresponding connector is a respective other of the first connector or the second connector;

wherein the detachable power connection comprises:

a male conductor, retained within the first connector, the male conductor matingly received within a female conductor, retained within the second connector;

an aligning insulator of the second connector for enclosing and internally retaining the female conductor, further comprising at least one first alignment feature formed along an exterior surface of the aligning insulator;

a locking body of the first connector for retaining the male conductor, the locking body comprising an interior surface for defining an internal void for matingly receiving the exterior surface of the aligning insulator therein, the locking body comprising at least one second alignment feature formed along the interior surface for matingly engaging the respective at least one first alignment feature of the aligning insulator;

a locking nut formed onto one of the first connector or second connector, for releasably securing the first and second connectors together to form the detachable power connection, and the reversible electrical cable further comprises a liner for transporting welding wire and extending continuously within the reversible cable, wherein the liner includes first and second ends that are received and retained within respective first and second threaded caps each retained within the respective identical cable connectors.

16. The reversible electrical cable of claim 15, further comprising a receiver, installed into at least one of the arc welding torch handle or the power pin handle, configured to receive the threaded cap, and thereby permit entry of the welding wire.

17. The reversible electrical cable of claim 15, wherein each threaded cap is configured to be inserted into and through a bore of a power connection barb at each end of the reversible cable.

* * * * *